United States Patent
Kavaklioglu

(10) Patent No.: US 8,401,819 B2
(45) Date of Patent: Mar. 19, 2013

(54) STATISTICAL PROCESSING METHODS USED IN ABNORMAL SITUATION DETECTION

(75) Inventor: Kadir Kavaklioglu, Eden Prairie, MN (US)

(73) Assignee: Fisher-Rosemount Systems, Inc., Round Rock, TX (US)

( * ) Notice: Subject to any disclaimer, the term of this patent is extended or adjusted under 35 U.S.C. 154(b) by 0 days.

(21) Appl. No.: 13/243,135

(22) Filed: Sep. 23, 2011

(65) Prior Publication Data

US 2012/0011180 A1    Jan. 12, 2012

Related U.S. Application Data

(62) Division of application No. 12/793,425, filed on Jun. 30, 2010, now Pat. No. 8,027,804, which is a division of application No. 10/589,728, filed as application No. PCT/US2006/012445 on Apr. 4, 2006, now Pat. No. 7,752,012.

(60) Provisional application No. 60/668,243, filed on Apr. 4, 2005.

(51) Int. Cl.
  *G06F 17/18*  (2006.01)
  *G06F 15/00*  (2006.01)
(52) U.S. Cl. ............. 702/179; 702/86; 702/147; 714/47
(58) Field of Classification Search ............ 702/58, 702/81, 104, 138, 179, 182, 183, 188, 86, 702/147; 700/29, 30, 31, 51, 109; 714/47
See application file for complete search history.

(56) References Cited

U.S. PATENT DOCUMENTS

| | | | |
|---|---|---|---|
| 5,960,214 A | | 9/1999 | Sharpe, Jr. et al. |
| 6,017,143 A | * | 1/2000 | Eryurek et al. ................ 700/51 |
| 6,456,947 B1 | | 9/2002 | Adamiak et al. |
| 6,549,864 B1 | | 4/2003 | Potyrailo |

(Continued)

FOREIGN PATENT DOCUMENTS

| CN | 1185841 | 6/1998 |
|---|---|---|
| CN | 1514928 | 7/2004 |

(Continued)

OTHER PUBLICATIONS

English-language translation of First Office Action for Chinese Application No. 200680011278.2, dated Dec. 4, 2009.

(Continued)

*Primary Examiner* — John H Le

(74) *Attorney, Agent, or Firm* — Marshall, Gerstein & Borun LLP

(57) ABSTRACT

Detection of one or more abnormal situations is performed using various statistical measures, such as a mean, a median, a standard deviation, etc. of one or more process parameters or variable measurements made by statistical process monitoring blocks within a plant. This detection is enhanced in various cases by using specialized data filters and data processing techniques, which are designed to be computationally simple and therefore are able to be applied to data collected at a high sampling rate in a field device having limited processing power. The enhanced data or measurements may be used to provided better or more accurate statistical measures of the data, may be used to trim the data to remove outliers from this data, may be used to fit this data to non-linear functions, or may be use to quickly detect the occurrence of various abnormal situations within specific plant equipment, such as distillation columns and fluid catalytic crackers.

8 Claims, 12 Drawing Sheets

U.S. PATENT DOCUMENTS

| | | | |
|---|---|---|---|
| 6,601,005 B1 | 7/2003 | Eryurek et al. | |
| 6,601,995 B1 | 8/2003 | Harrison et al. | |
| 6,901,351 B2 * | 5/2005 | Daw et al. | 702/188 |
| 7,085,610 B2 | 8/2006 | Eryurek et al. | |
| 7,181,654 B2 * | 2/2007 | Ford et al. | 714/47.2 |
| 7,424,395 B2 | 9/2008 | Emigholz et al. | |
| 7,752,012 B2 | 7/2010 | Kavaklioglu | |
| 8,027,804 B2 | 9/2011 | Kavaklioglu | |
| 2002/0029130 A1 * | 3/2002 | Eryurek et al. | 702/183 |
| 2003/0065409 A1 | 4/2003 | Raeth et al. | |
| 2005/0267709 A1 * | 12/2005 | Heavner et al. | 702/183 |

FOREIGN PATENT DOCUMENTS

| | | |
|---|---|---|
| GB | 2 379 749 | 3/2003 |

OTHER PUBLICATIONS

English-language translation of Second Office Action for Chinese Application No. 200680011278.2, dated Oct. 28, 2010.
International Preliminary Report on Patentability for International Application No. PCT/US2006/012445, dated Oct. 18, 2007.
International Search Report issued in PCT/2006/012445 mailed on Aug. 23, 2006.
Written Opinion issued in PCT/US2006/012445 application mailed on Aug. 23, 2006.
European Office Action for Application No. 06749217.3, dated Feb. 29, 2008.
European Office Action for Application No. 06749217.3, dated Mar. 2, 2009.

* cited by examiner

STATISTICAL PROCESSING METHODS USED IN ABNORMAL SITUATION DETECTION

CROSS-REFERENCE TO RELATED APPLICATIONS

This application is a divisional application of and claims priority to prior U.S. patent application Ser. No. 12/793,425, entitled "Statistical Processing Methods Used in Abnormal Situation Detection," which was filed Jun. 3, 2010, which is a divisional application of and claims priority to prior U.S. patent application Ser. No. 10/589,728, entitled "Statistical Processing Methods Used in Abnormal Situation Detection," which was filed on Aug. 17, 2006, which is a U.S. national stage of PCT/US06/12445, entitled "Statistical Processing Methods Used in Abnormal Situation Detection," which was filed Apr. 4, 2006, which in turn claims the benefit of U.S. Provisional Application No. 60/668,243 entitled "Process Diagnostics," which was filed on Apr. 4, 2005, all of which are hereby expressly incorporated by reference herein in their entirety for all purposes.

FIELD OF THE DISCLOSURE

This patent relates generally to performing diagnostics and maintenance in a process plant and, more particularly, to providing diagnostic capabilities within a process plant in a manner that reduces or prevents abnormal situations within the process plant.

BACKGROUND

Process control systems, like those used in chemical, petroleum or other processes, typically include one or more centralized or decentralized process controllers communicatively coupled to at least one host or operator workstation and to one or more process control and instrumentation devices such as, for example, field devices, via analog, digital or combined analog/digital buses. Field devices, which may be, for example, valves, valve positioners, switches, transmitters, and sensors (e.g., temperature, pressure, and flow rate sensors), are located within the process plant environment, and perform functions within the process such as opening or closing valves, measuring process parameters, increasing or decreasing fluid flow, etc. Smart field devices such as field devices conforming to the well-known FOUNDATION™ Fieldbus (hereinafter "Fieldbus") protocol or the HART® protocol may also perform control calculations, alarming functions, and other control functions commonly implemented within the process controller.

The process controllers, which are typically located within the process plant environment, receive signals indicative of process measurements or process variables made by or associated with the field devices and/or other information pertaining to the field devices, and execute controller applications. The controller applications implement, for example, different control modules that make process control decisions, generate control signals based on the received information, and coordinate with the control modules or blocks being performed in the field devices such as HART and Fieldbus field devices. The control modules in the process controllers send the control signals over the communication lines or signal paths to the field devices, to thereby control the operation of the process.

Information from the field devices and the process controllers is typically made available to one or more other hardware devices such as, for example, operator workstations, maintenance workstations, personal computers, handheld devices, data historians, report generators, centralized databases, etc. to enable an operator or a maintenance person to perform desired functions with respect to the process such as, for example, changing settings of the process control routine, modifying the operation of the control modules within the process controllers or the smart field devices, viewing the current state of the process or of particular devices within the process plant, viewing alarms generated by field devices and process controllers, simulating the operation of the process for the purpose of training personnel or testing the process control software, diagnosing problems or hardware failures within the process plant, etc.

While a typical process plant has many process control and instrumentation devices such as valves, transmitters, sensors, etc. connected to one or more process controllers, there are many other supporting devices that are also necessary for or related to process operation. These additional devices include, for example, power supply equipment, power generation and distribution equipment, rotating equipment such as turbines, motors, etc., which are located at numerous places in a typical plant. While this additional equipment does not necessarily create or use process variables and, in many instances, is not controlled or even coupled to a process controller for the purpose of affecting the process operation, this equipment is nevertheless important to, and ultimately necessary for proper operation of the process.

As is known, problems frequently arise within a process plant environment, especially a process plant having a large number of field devices and supporting equipment. These problems may take the form of broken or malfunctioning devices, plugged fluid lines or pipes, logic elements, such as software routines, being improperly configured or being in improper modes, process control loops being improperly tuned, one or more failures in communications between devices within the process plant, etc. These and other problems, while numerous in nature, generally result in the process operating in an abnormal state (i.e., the process plant being in an abnormal situation) which is usually associated with suboptimal performance of the process plant. Many diagnostic tools and applications have been developed to detect and determine the cause of problems within a process plant and to assist an operator or a maintenance person to diagnose and correct the problems, once the problems have occurred and been detected. For example, operator workstations, which are typically connected to the process controllers through communication connections such as a direct or a wireless bus, an Ethernet, a modem, a phone line, and the like, have processors and memories that are adapted to run software or firmware, such as the DeltaV™ and Ovation control systems, sold by Emerson Process Management, wherein the software includes numerous control module and control loop diagnostic tools. Likewise, maintenance workstations, which may be connected to the process control devices, such as field devices, via the same communication connections as the controller applications, or via different communication connections, such as OPC connections, handheld connections, etc., typically include one or more applications designed to view maintenance alarms and alerts generated by field devices within the process plant, to test devices within the process plant and to perform maintenance activities on the field devices and other devices within the process plant. Similar diagnostic applications have been developed to diagnose problems within the supporting equipment within the process plant.

Thus, for example, the Asset Management Solutions (AMS) application (at least partially disclosed in U.S. Pat. No. 5,960,214 entitled "Integrated Communication Network for use in a Field Device Management System") sold by Emerson Process Management, enables communication with and stores data pertaining to field devices to ascertain and track the operating state of the field devices. In some instances, the AMS application may be used to communicate with a field device to change parameters within the field device, to cause the field device to run applications on itself such as, for example, self-calibration routines or self-diagnostic routines, to obtain information about the status or health of the field device, etc. This information may include, for example, status information (e.g., whether an alarm or other similar event has occurred), device configuration information (e.g., the manner in which the field device is currently or may be configured and the type of measuring units used by the field device), device parameters (e.g., the field device range values and other parameters), etc. Of course, this information may be used by a maintenance person to monitor, maintain, and/or diagnose problems with field devices.

Similarly, many process plants include equipment monitoring and diagnostic applications such as, for example, RBMware provided by CSI Systems, or any other known applications used to monitor, diagnose, and optimize the operating state of various rotating equipment. Maintenance personnel usually use these applications to maintain and oversee the performance of rotating equipment in the plant, to determine problems with the rotating equipment, and to determine when and if the rotating equipment must be repaired or replaced. Similarly, many process plants include power control and diagnostic applications such as those provided by, for example, the Liebert and ASCO companies, to control and maintain the power generation and distribution equipment. It is also known to run control optimization applications such as, for example, real-time optimizers (RTO+), within a process plant to optimize the control activities of the process plant. Such optimization applications typically use complex algorithms and/or models of the process plant to predict how inputs may be changed to optimize operation of the process plant with respect to some desired optimization variable such as, for example, profit.

These and other diagnostic and optimization applications are typically implemented on a system-wide basis in one or more of the operator or maintenance workstations, and may provide preconfigured displays to the operator or maintenance personnel regarding the operating state of the process plant, or the devices and equipment within the process plant. Typical displays include alarming displays that receive alarms generated by the process controllers or other devices within the process plant, control displays indicating the operating state of the process controllers and other devices within the process plant, maintenance displays indicating the operating state of the devices within the process plant, etc. Likewise, these and other diagnostic applications may enable an operator or a maintenance person to retune a control loop or to reset other control parameters, to run a test on one or more field devices to determine the current status of those field devices, to calibrate field devices or other equipment, or to perform other problem detection and correction activities on devices and equipment within the process plant.

While these various applications and tools are very helpful in identifying and correcting problems within a process plant, these diagnostic applications are generally configured to be used only after a problem has already occurred within a process plant and, therefore, after an abnormal situation already exists within the plant. Unfortunately, an abnormal situation may exist for some time before it is detected, identified and corrected using these tools, resulting in the suboptimal performance of the process plant for the period of time during which the problem is detected, identified and corrected. In many cases, a control operator will first detect that some problem exists based on alarms, alerts or poor performance of the process plant. The operator will then notify the maintenance personnel of the potential problem. The maintenance personnel may or may not detect an actual problem and may need further prompting before actually running tests or other diagnostic applications, or performing other activities needed to identify the actual problem. Once the problem is identified, the maintenance personnel may need to order parts and schedule a maintenance procedure, all of which may result in a significant period of time between the occurrence of a problem and the correction of that problem, during which time the process plant runs in an abnormal situation generally associated with the sub-optimal operation of the plant.

Additionally, many process plants can experience an abnormal situation which results in significant costs or damage within the plant in a relatively short amount of time. For example, some abnormal situations can cause significant damage to equipment, the loss of raw materials, or significant unexpected downtime within the process plant if these abnormal situations exist for even a short amount of time. Thus, merely detecting a problem within the plant after the problem has occurred, no matter how quickly the problem is corrected, may still result in significant loss or damage within the process plant. As a result, it is desirable to try to prevent abnormal situations from arising in the first place, instead of simply trying to react to and correct problems within the process plant after an abnormal situation arises.

There is currently one technique that may be used to collect data that enables a user to predict the occurrence of certain abnormal situations within a process plant before these abnormal situations actually arise or shortly after they arise, with the purpose of taking steps to prevent the predicted abnormal situation or to correct the abnormal situation before any significant loss within the process plant takes place. This procedure is disclosed in U.S. patent application Ser. No. 09/972,078, entitled "Root Cause Diagnostics" (based in part on U.S. patent application Ser. No. 08/623,569, now U.S. Pat. No. 6,017,143). The entire disclosures of both of these applications/patents are hereby incorporated by reference herein. Generally speaking, this technique places statistical data collection and processing blocks or statistical processing monitoring (SPM) blocks, in each of a number of devices, such as field devices, within a process plant. The statistical data collection and processing blocks collect, for example, process variable data and determine certain statistical measures associated with the collected data, such as a mean, a median, a standard deviation, etc. These statistical measures may then sent to a user interface or other processing device and analyzed to recognize patterns suggesting the actual or future occurrence of a known abnormal situation. Once a particular suspected abnormal situation is detected, steps may be taken to correct the underlying problem, thereby avoiding the abnormal situation in the first place or correcting the abnormal situation quickly. However, the collection and analysis of this data may be time consuming and tedious for a typical maintenance operator, especially in process plants having a large number of field devices collecting this statistical data. Still further, while a maintenance person may be able to collect the statistical data, this person may not know how to best analyze or view the data or to determine what, if any, future abnormal situation may be suggested by the data.

SUMMARY

Detection or prediction of one or more abnormal situations is performed using various statistical measures, such as a mean, median, standard deviation, etc. of process parameters or variable measurements determined by statistical process monitoring (SPM) blocks within a plant. This detection is enhanced in various cases by the use of specialized data filters and data processing techniques, which are designed to be computationally simple and therefore are able to be applied to data collected at a high sampling rate in a field device having limited processing power. The enhanced data or measurements may be used to provided better or more accurate statistical measures of the process variable or process parameter, may be used to trim the data to remove outliers from this data, may be used to fit this data to non-linear functions, or may be use to quickly detect the occurrence of various abnormal situations within specific plant equipment, such as distillation columns and refinery catalytic crackers. While the statistical data collection and processing and abnormal situation detection may be performed within a user interface device or other maintenance device within a process plant, these methods may also and advantageously be used in the devices, such as field devices like valves, transmitters, etc. which collect the data in the first place, thereby removing the processing burden from the centralized user interface device as well as the communication overhead associated with sending the statistical data from the field devices to the user interface device.

The methods described herein can be applied in many different scenarios within a process plant on many different types of data, to detect whether one or more abnormal situations exist or may be developing within a plant. For example, the statistical data may comprise statistical data generated based on pressure, level, flow, position and temperature variables sensed by one or more pressure, level, flow, position and temperature sensors associated with, for example, a distillation column or a refinery catalytic cracker unit. Of course, if an abnormal situation is detected, an indicator of the abnormal situation may be generated and the indicator may be used, for example, to notify an operator or maintenance personnel or to affect control of plant equipment.

DETAILED DESCRIPTION

Figure 1:
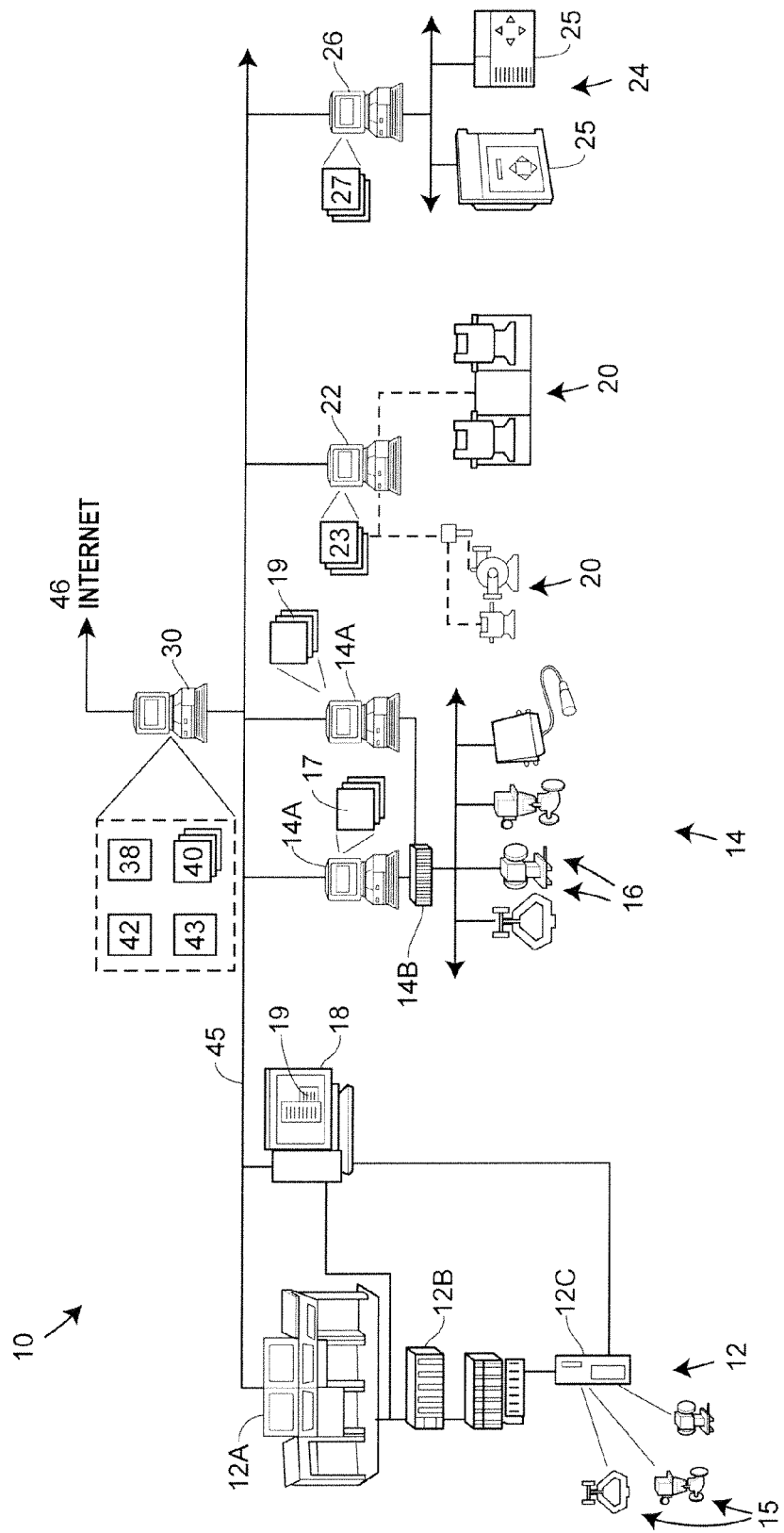
FIG. 1 is an exemplary block diagram of a process plant having a distributed control and maintenance network including one or more operator and maintenance workstations, controllers, field devices and supporting equipment.

Referring now to FIG. 1, an example process plant 10 in which an abnormal situation prevention system may be implemented includes a number of control and maintenance systems interconnected together with supporting equipment via one or more communication networks. In particular, the process plant 10 of FIG. 1 includes one or more process control systems 12 and 14. The process control system 12 may be a traditional process control system such as a PROVOX or RS3 system or any other control system which includes an operator interface 12A coupled to a controller 12B and to input/output (I/O) cards 12C which, in turn, are coupled to various field devices such as analog and Highway Addressable Remote Transmitter (HART) field devices 15. The process control system 14, which may be a distributed process control system, includes one or more operator interfaces 14A coupled to one or more distributed controllers 14B via a bus, such as an Ethernet bus. The controllers 14B may be, for example, DeltaV™ controllers sold by Emerson Process Management of Austin, Tex. or any other desired type of controllers. The controllers 14B are connected via I/O devices to one or more field devices 16, such as for example, HART or Fieldbus field devices or any other smart or non-smart field devices including, for example, those that use any of the PROFIBUS®, WORLDFIP®, Device-Net®, AS-Interface and CAN protocols. As is known, the field devices 16 may provide analog or digital information to the controllers 14B related to process variables as well as to other device information. The operator interfaces 14A may store and execute tools available to the process control operator for controlling the operation of the process including, for example, control optimizers, diagnostic experts, neural networks, tuners, etc.

Still further, maintenance systems, such as computers executing the AMS application or any other device monitoring and communication applications may be connected to the process control systems 12 and 14 or to the individual devices therein to perform maintenance and monitoring activities. For example, a maintenance computer 18 may be connected to the controller 12B and/or to the devices 15 via any desired communication lines or networks (including wireless or handheld device networks) to communicate with and, in some instances, to reconfigure or to perform other maintenance activities on the devices 15. Similarly, maintenance applications such as the AMS application may be installed in and executed by one or more of the user interfaces 14A associated with the distributed process control system 14 to perform maintenance and monitoring functions, including data collection related to the operating status of the devices 16.

The process plant 10 also includes various rotating equipment 20, such as turbines, motors, etc. which are connected to a maintenance computer 22 via some permanent or temporary communication link (such as a bus, a wireless communication system or hand held devices which are connected to the equipment 20 to take readings and are then removed). The maintenance computer 22 may store and execute known monitoring and diagnostic applications 23 provided by, for example, CSI (an Emerson Process Management Company) or other any other known applications used to diagnose, monitor and optimize the operating state of the rotating equipment 20. Maintenance personnel usually use the applications 23 to maintain and oversee the performance of rotating equipment 20 in the plant 10, to determine problems with the rotating equipment 20 and to determine when and if the rotating equipment 20 must be repaired or replaced. In some cases, outside consultants or service organizations may temporarily acquire or measure data pertaining to the equipment 20 and use this data to perform analyses for the equipment 20 to detect problems, poor performance or other issues effecting the equipment 20. In these cases, the computers running the analyses may not be connected to the rest of the system 10 via any communication line or may be connected only temporarily.

Similarly, a power generation and distribution system 24 having power generating and distribution equipment 25 associated with the plant 10 is connected via, for example, a bus, to another computer 26 which runs and oversees the operation of the power generating and distribution equipment 25 within the plant 10. The computer 26 may execute known power control and diagnostics applications 27 such a as those provided by, for example, Liebert and ASCO or other companies to control and maintain the power generation and distribution equipment 25. Again, in many cases, outside consultants or service organizations may use service applications that temporarily acquire or measure data pertaining to the equipment 25 and use this data to perform analyses for the equipment 25 to detect problems, poor performance or other issues effecting the equipment 25. In these cases, the computers (such as the computer 26) running the analyses may not be connected to the rest of the system 10 via any communication line or may be connected only temporarily.

As illustrated in FIG. 1, a computer system 30 implements at least a portion of an abnormal situation prevention system 35, and in particular, the computer system 30 stores and implements a configuration and data collection application 38, a viewing or interface application 40, which may include statistical collection and processing blocks, and a rules engine development and execution application 42 and, additionally, stores a statistical process monitoring database 43 that stores statistical data generated within certain devices within the process, such as statistical measures of various process parameters. Generally speaking, the configuration and data collection application 38 configures and communicates with each of a number of statistical data collection and analysis blocks (not shown in FIG. 1) located in the field devices 15, 16, the controllers 12B, 14B, the rotating equipment 20 or its supporting computer 22, the power generation equipment 25 or its supporting computer 26 and any other desired devices and equipment within the process plant 10, to thereby collect statistical data (or in some cases, actual raw process variable data) from each of these blocks with which to perform abnormal situation detection. The configuration and data collection application 38 may be communicatively connected via a hardwired bus 45 to each of the computers or devices within the plant 10 or, alternatively, may be connected via any other desired communication connection including, for example, wireless connections, dedicated connections which use OPC, intermittent connections, such as ones which rely on handheld devices to collect data, etc.

Likewise, the application 38 may obtain data pertaining to the field devices and equipment within the process plant 10 via a LAN or a public connection, such as the Internet, a telephone connection, etc. (illustrated in FIG. 1 as an Internet connection 46) with such data being collected by, for example, a third party service provider. Further, the application 38 may be communicatively coupled to computers/devices in the plant 10 via a variety of techniques and/or protocols including, for example, Ethernet, Modbus, HTML, XML, proprietary techniques/protocols, etc. Thus, although particular examples using OPC to communicatively couple the application 38 to computers/devices in the plant 10 are described herein, one of ordinary skill in the art will recognize that a variety of other methods of coupling the application 38 to computers/devices in the plant 10 can be used as well. The application 38 may generally store the collected data in the database 43.

Once the statistical data (or process variable data) is collected, the viewing application 40 may be used to process this data and/or to display the collected or processed statistical data (e.g., as stored in the database 43) in different manners to enable a user, such as a maintenance person, to better be able to determine the existence of or the predicted future existence of an abnormal situation and to take preemptive or actual corrective actions. The rules engine development and execution application 42 may use one or more rules stored therein to analyze the collected data to determine the existence of, or to predict the future existence of an abnormal situation within the process plant 10. Additionally, the rules engine development and execution application 42 may enable an operator or other user to create additional rules to be implemented by a rules engine to detect or predict abnormal situations. It is appreciated that the detection of an abnormal situation as described herein encompasses the prediction of a future occurrence of an abnormal situation.

Figure 2:
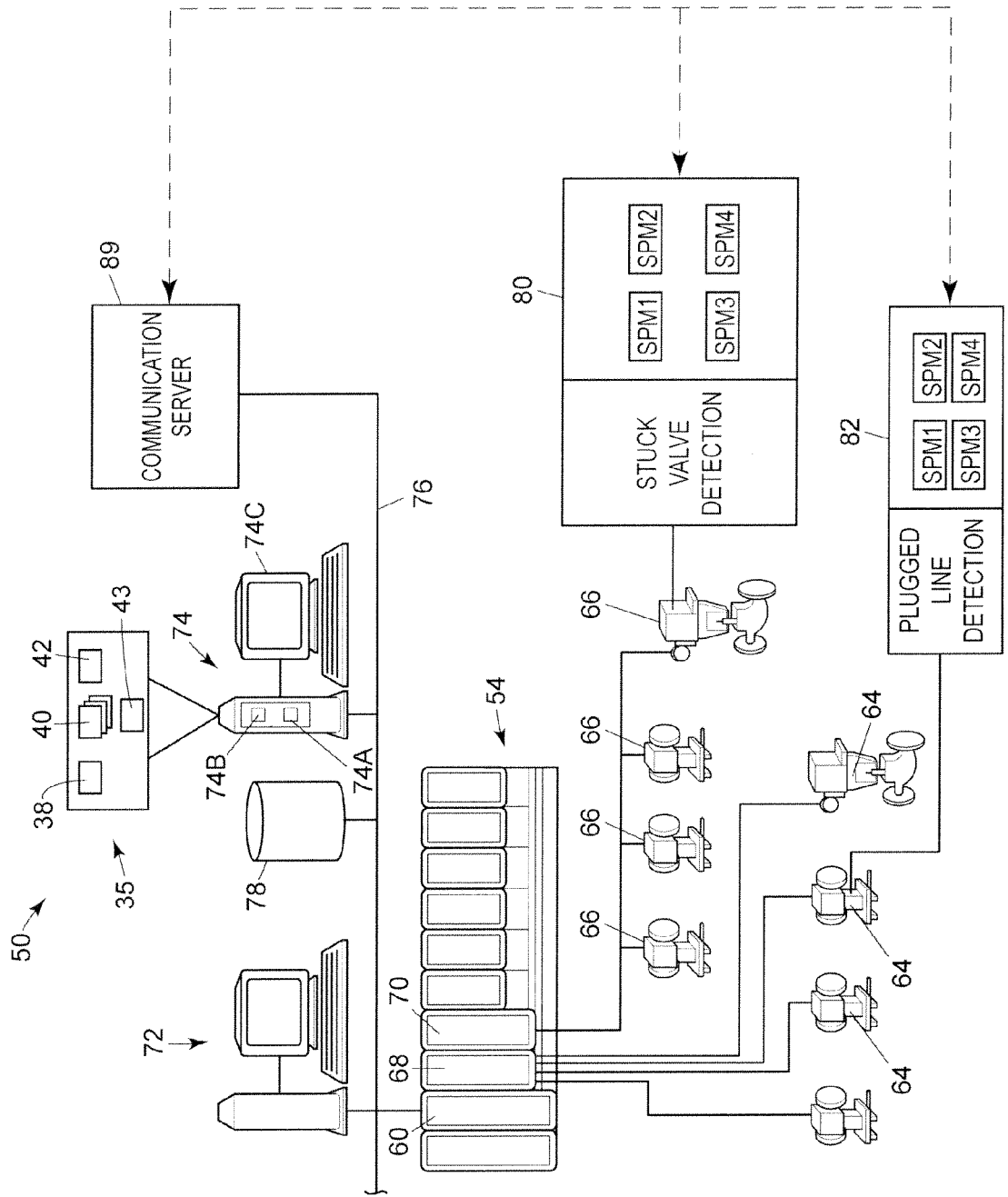
FIG. 2 is an exemplary block diagram of a portion of the process plant of FIG. 1, illustrating communication interconnections between various components of an abnormal situation prevention system located within different elements of the process plant, including the use of statistical process monitoring (SPM) blocks.

FIG. 2 illustrates a portion 50 of the example process plant 10 of FIG. 1 for the purpose of describing one manner in which statistical data collection and processing and in some cases abnormal situation detection may be performed by components associated with the abnormal situation prevention system 35 including blocks located within field devices. While FIG. 2 illustrates communications between the abnormal situation prevention system applications 38, 40 and 42 and the database 43 and one or more data collection and processing blocks within HART and Fieldbus field devices, it will be understood that similar communications can occur between the abnormal situation prevention system applications 38, 40 and 42 and other devices and equipment within the process plant 10, including any of the devices and equipment illustrated in FIG. 1.

The portion 50 of the process plant 10 illustrated in FIG. 2 includes a distributed process control system 54 having one or more process controllers 60 connected to one or more field devices 64 and 66 via input/output (I/O) cards or devices 68 and 70, which may be any desired types of I/O devices conforming to any desired communication or controller protocol. The field devices 64 are illustrated as HART field devices and the field devices 66 are illustrated as Fieldbus field devices, although these field devices could use any other desired communication protocols. Additionally, the field devices 64 and 66 may be any types of devices such as, for example, sensors, valves, transmitters, positioners, etc., and may conform to any desired open, proprietary or other communication or programming protocol, it being understood that the I/O devices 68 and 70 must be compatible with the desired protocol used by the field devices 64 and 66.

In any event, one or more user interfaces or computers 72 and 74 (which may be any types of personal computers, workstations, etc.) accessible by plant personnel such as configuration engineers, process control operators, maintenance personnel, plant managers, supervisors, etc. are coupled to the process controllers 60 via a communication line or bus 76 which may be implemented using any desired hardwired or wireless communication structure, and using any desired or suitable communication protocol such as, for example, an Ethernet protocol. In addition, a database 78 may be connected to the communication bus 76 to operate as a data historian that collects and stores configuration information as well as on-line process variable data, parameter data, status data, and other data associated with the process controllers 60 and field devices 64 and 66 within the process plant 10. Thus, the database 78 may operate as a configuration database to store the current configuration, including process configuration modules, as well as control configuration information for the process control system 54 as downloaded to and stored within the process controllers 60 and the field devices 64 and 66. Likewise, the database 78 may store historical abnormal situation prevention data, including statistical data collected and/or generated by the field devices 64 and 66 within the process plant 10 or statistical data determined from process variables collected by the field devices 64 and 66.

While the process controllers 60, I/O devices 68 and 70, and field devices 64 and 66 are typically located down within and distributed throughout the sometimes harsh plant environment, the workstations 72 and 74, and the database 78 are usually located in control rooms, maintenance rooms or other less harsh environments easily accessible by operators, maintenance personnel, etc.

Generally speaking, the process controllers 60 store and execute one or more controller applications that implement control strategies using a number of different, independently executed, control modules or blocks. The control modules may each be made up of what are commonly referred to as function blocks, wherein each function block is a part or a subroutine of an overall control routine and operates in conjunction with other function blocks (via communications called links) to implement process control loops within the process plant 10. As is well known, function blocks, which may be objects in an object-oriented programming protocol, typically perform one of an input function, such as that associated with a transmitter, a sensor or other process parameter measurement device, a control function, such as that associated with a control routine that performs PID, fuzzy logic, etc. control, or an output function, which controls the operation of some device, such as a valve, to perform some physical function within the process plant 10. Of course, hybrid and other types of complex function blocks exist, such as model predictive controllers (MPCs), optimizers, etc. It is to be understood that while the Fieldbus protocol and the DeltaV™ system protocol use control modules and function blocks designed and implemented in an object-oriented programming protocol, the control modules may be designed using any desired control programming scheme including, for example, sequential function blocks, ladder logic, etc., and are not limited to being designed using function blocks or any other particular programming technique.

As illustrated in FIG. 2, the maintenance workstation 74 includes a processor 74A, a memory 74B and a display device 74C. The memory 74B stores the abnormal situation prevention applications 38, 40 and 42 discussed with respect to FIG. 1 in a manner that these applications can be implemented on the processor 74A to provide information to a user via the display 74C (or any other display device, such as a printer).

Additionally, as shown in FIG. 2, some (and potentially all) of the field devices 64 and 66 include data collection and processing blocks 80 and 82. While, the blocks 80 and 82 are described with respect to FIG. 2 as being advanced diagnostics blocks (ADBs), which are known Foundation Fieldbus function blocks that can be added to Fieldbus devices to collect and process statistical data within Fieldbus devices, for the purpose of this discussion, the blocks 80 and 82 could be or could include any other type of block or module located within a process device that collects device data and calculates or determines one or more statistical measures or parameters for that data, whether or not these blocks are located in Fieldbus devices or conform to the Fieldbus protocol. While the blocks 80 and 82 of FIG. 2 are illustrated as being located in one of the devices 64 and in one of the devices 66, these or similar blocks could be located in any number of the field devices 64 and 66, could be located in other devices, such as the controller 60, the I/O devices 68, 70, in an intermediate device that is located within the plant and that communicates with multiple sensors or transmitters and with the controller 60, or any of the devices illustrated in FIG. 1. Additionally, the blocks 80 and 82 could be in any subset of the devices 64 and 66.

Generally speaking, the blocks 80 and 82 or sub-elements of these blocks, collect data, such a process variable data, within the device in which they are located and perform statistical processing or analysis on the data for any number of reasons. For example, the block 80, which is illustrated as being associated with a valve, may have a stuck valve detection routine which analyzes the valve process variable data to determine if the valve is in a stuck condition. In addition, the block 80 includes a set of four statistical process monitoring (SPM) blocks or units SPM1-SPM4 which may collect process variable or other data within the valve and perform one or more statistical calculations on the collected data to determine, for example, a mean, a median, a standard deviation, a root-mean-square (RMS), a rate of change, a range, a minimum, a maximum, etc. of the collected data and/or to detect events such as drift, bias, noise, spikes, etc., in the collected data. Neither the specific statistical data generated, nor the method in which it is generated is critical. Thus, different types of statistical data can be generated in addition to, or instead of, the specific types described above. Additionally, a variety of techniques, including known techniques, can be used to generate such data. The term statistical process monitoring (SPM) block is used herein to describe functionality that performs statistical process monitoring on at least one process variable or other process parameter, and may be performed by any desired software, firmware or hardware within the device or even outside of a device for which data is collected. It will be understood that, because the SPMs are generally located in the devices where the device data is collected, the SPMs can acquire quantitatively and qualitatively more accurate process variable data. As a result, the SPM blocks are generally capable of determining better statistical calculations with respect to the collected process variable data than a block located outside of the device in which the process variable data is collected.

As another example, the block 82 of FIG. 2, which is illustrated as being associated with a transmitter, may have a plugged line detection unit that analyzes the process variable data collected by the transmitter to determine if a line within the plant is plugged. In addition, the block 82 includes a set of four SPM blocks or units SPM1-SPM4 which may collect process variable or other data within the transmitter and perform one or more statistical calculations on the collected data to determine, for example, a mean, a median, a standard deviation, etc. of the collected data. If desired, the underlying operation of the blocks 80 and 82 may be performed or implemented as described in U.S. Pat. No. 6,017,143 referred to above. While the blocks 80 and 82 are illustrated as including four SPM blocks each, the blocks 80 and 82 could have any other number of SPM blocks therein for collecting data and determining statistical measures associated with that data. Likewise, while the blocks 80 and 82 are illustrated as including detection software for detecting particular conditions within the plant 10, they need not have such detection software or could include detection software for detecting other conditions within the plant as described below. Still further, while the SPM blocks discussed herein are illustrated as being sub-elements of ADBs, they may instead be stand-alone blocks located within a device. Also, while the SPM blocks discussed herein may be known Foundation Fieldbus SPM blocks, the term statistical process monitoring (SPM) block is used herein to refer to any type of block or element that collects data, such as process variable data, and performs some statistical processing on this data to determine a statistical measure, such as a mean, a standard deviation, etc. As a result, this term is intended to cover software or firmware or other elements that perform this function, whether these elements are in the form of function blocks, or other types of blocks, programs, routines or elements and whether or not these elements conform to the Foundation Fieldbus protocol, or some other protocol, such as PROFIBUS, WORLDFIP, Device-Net, AS-Interface, HART, CAN, etc., protocols.

Figure 3:
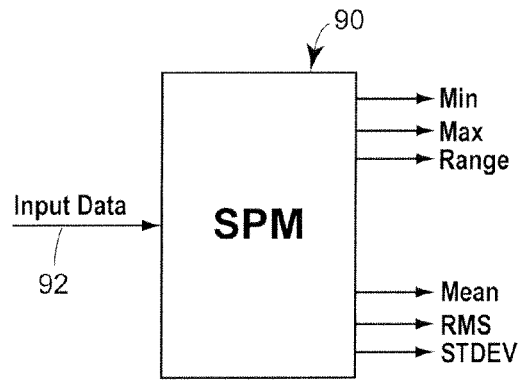
FIG. 3 is a block diagram of an example SPM block.

FIG. 3 illustrates a block diagram of an SPM block 90 (which could be any of the SPM blocks in the blocks 80 and 82 of FIG. 2) which accepts raw data on an input 92 and operates to calculate various statistical measures of that data, including a Mean, an RMS value, and one or more standard deviations. For a given set of raw input data, the block 90 may also determine a minimum value (Min), a maximum value (Max) and a range. If desired, this block may calculate specific points within the data, such as the Q25, Q50 and Q75 points and may perform outliner removal based on the distributions. Of course this statistical processing can be performed using any desired or known processing techniques.

Figure 4:
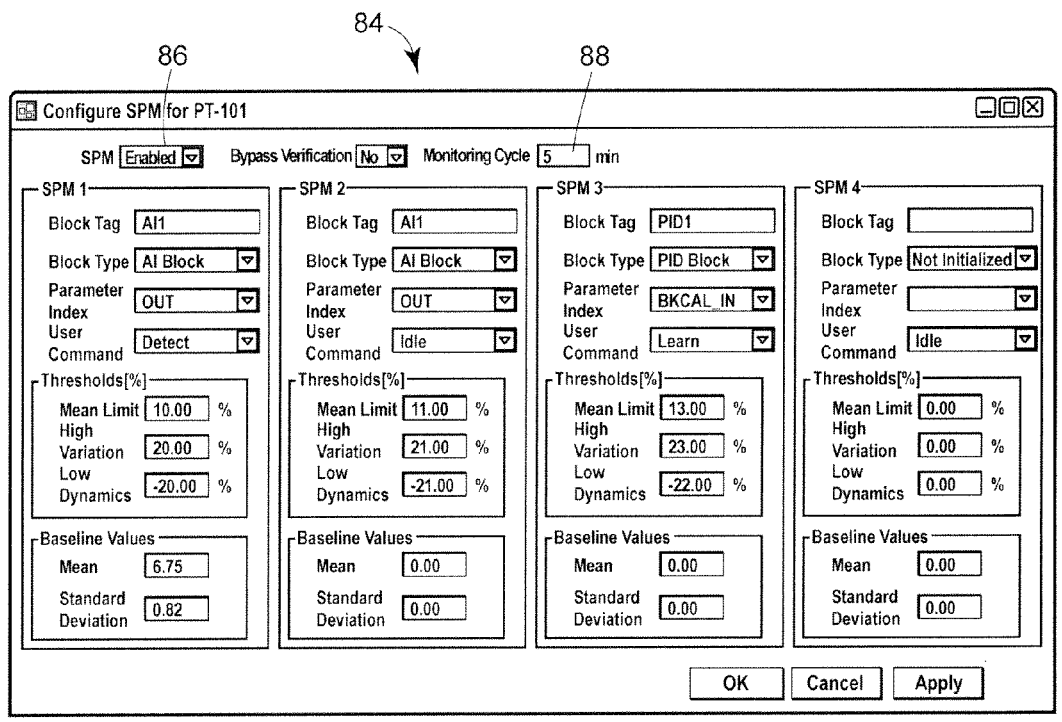
FIG. 4 is a display illustrating the configuration of a set of statistical process monitoring blocks within a device of the process plant of FIG. 1 or 2.

Referring again to FIG. 2, in one embodiment, each SPM block within the ADBs 80 and 82 can be either active or inactive. An active SPM block is one that is currently monitoring a process variable (or other process parameter) while an inactive SPM block is one that is not currently monitoring a process variable. Generally speaking, SPM blocks are, by default, inactive and, therefore, each one must generally be individually configured to monitor a process variable. FIG. 4 illustrates an example configuration display 84 that may be presented to a user, engineer, etc. to depict and change the current SPM configuration for a device. As indicated in the display 84, SPM blocks 1, 2 and 3 for this particular device have all been configured, while SPM block 4 has not been configured. Each of the configured SPM blocks SPM1, SPM2 and SPM3 is associated with a particular block within a device (as indicated by the block tag), a block type, a parameter index within the block (i.e., the parameter being monitored) and a user command which indicates the monitoring functionality of the SPM block. Still further, each configured SPM block includes a set of thresholds to which determined statistical parameters are to be compared, including for example, a mean limit, a high variation limit (which specifies a value that indicates too much variation in the signal) and low dynamics (which specifies a value that indicates too little variation in the signal). Essentially, detecting a change in a mean may indicate that the process is drifting up or down, detecting a high variation may mean that an element within the process is experiencing unexpected noise (such as that caused by increased vibration) and detecting a low variation may mean that a process signal is getting filtered or that an element is getting suspiciously quiet, like a stuck valve for example. Still further, baseline values, such as a mean and a standard deviation may be set for each SPM block. These baseline values may be used to determine whether limits have been met or exceeded within the device. SPM blocks 1 and 3 of FIG. 4 are both active because they have received user commands to start monitoring. On the other hand, SPM block 2 is inactive because it is in the Idle state. Also, in this example SPM capabilities are enabled for the entire device as indicated by the box 86 and are set to be monitored or calculated every five minutes, as indicated by the box 88. Of course, an authorized user could reconfigure the SPM blocks within the device to monitor other blocks, such as other function blocks, within the device, other parameters associated with these or other blocks within the device, as well as to have other thresholds, baseline values, etc.

While certain statistical monitoring blocks are illustrated in FIGS. 2 and 4, it will be understood that other parameters could be monitored as well or in addition. For example, the SPM blocks, or the ADBs discussed with respect to FIG. 2 may calculate statistical parameters associated with a process and may trigger certain alerts, based on changes in these values. By way of example, Fieldbus type SPM blocks may monitor process variables and provide 15 different parameters associated with that monitoring. These parameters include Block Tag, Block Type, Mean, Standard Deviation, Mean Change, Standard Deviation Change, Baseline Mean, Baseline Standard Deviation, High Variation Limit, Low Dynamics Limit, Mean Limit, Status, Parameter Index, Time Stamp and User Command. The two most useful parameters are currently considered to be the Mean and Standard Deviation. However, other SPM parameters that are often useful are Baseline Mean, Baseline Standard Deviation, Mean Change, Standard Deviation Change, and Status. Of course, the SPM blocks could determine any other desired statistical measures or parameters and could provide other parameters associated with a particular block to a user or requesting application. Thus, SPM blocks are not limited to the ones discussed herein.

As will be understood, the parameters of the SPM blocks (SPM1-SPM4) within the field devices may be made available to an external client, such as to the workstation 74 through the bus or communication network 76 and the controller 60. Additionally or in the alternative, the parameters and other information gathered by or generated by the SPM blocks (SPM1-SPM4) within the ADBs 80 and 82 may be made available to the workstation 74 through, for example, an OPC server 89. This connection may be a wireless connection, a hardwired connection, an intermittent connection (such as one that uses one or more handheld devices) or any other desired communication connection using any desired or appropriate communication protocol. Of course, any of the communication connections described herein may use an OPC communication server to integrate data received from different types of devices in a common or consistent format.

Still further, it is possible to place SPM blocks in host devices, other devices other than field devices, or other field devices to perform statistical process monitoring outside of the device that collects or generates the raw data, such as the raw process variable data. Thus, for example, the application 38 of FIG. 2 may include one or more SPM blocks which collect raw process variable data via, for example, the OPC server 89 and which calculate some statistical measure or parameter, such as a mean, a standard deviation, etc. for that process variable data. While these SPM blocks are not located in the device which collects the data and, therefore, are generally not able to collect as much process variable data to perform the statistical calculations due to the communication requirements for this data, these blocks are helpful in determining statistical parameters for devices or process variable within devices that do not have or support SPM functionality. Additionally, available throughput of networks may increase over time as technology improves, and SPM blocks not located in the device which collects the raw data may be able to collect more process variable data to perform the statistical calculations. Thus, it will be understood in the discussion below, that any statistical measurements or parameters described to be generated by SPM blocks, may be generated by SPM blocks such as the SPM1-SPM4 blocks in the ADBs 80 and 82, or in SPM blocks within a host or other devices including other field devices. Moreover, abnormal situation detection and other data processing may be performed using the statistical measures in the field devices or other devices in which the SPM blocks are located, and thus detection based on the statistical measures produced by the SPM blocks is not limited to detection performed in host devices, such as user interfaces.

Importantly, the maximum beneficial use of raw statistical data and the calculation of various statistical measures based on this data as described above is dependent in large part on the accuracy of the raw or collected data in the first place. A number of data processing functions or methods may be applied in the SPM blocks to increase the accuracy or usefulness of the raw data and/or to preprocess the raw data and develop more accurate or better statistical data in the SPM blocks. These data processing functions may be applied to massage or process raw field data prior to exposing the raw or processed data to other field devices and host systems. Moreover, in some cases, these data processing functions may be used to provide diagnostics on the processed data or on the raw data to generate alarms and/or warnings to users, other field devices and host systems. The below described data processing functions and methodologies are applicable to all communication protocols such as HART, Fieldbus, Profibus, etc. and are applicable to all field devices such as transmitters, controllers, actuators, etc.

As will be understood, performing statistical and digital signal processing within a field device provides the capability to operate on the raw measurement data before any measurement and control related modifications are made in the plant using the raw data. Therefore, the signatures computed within a device are the best indicators of the state of the sensing system, the mechanical equipment and the process in which the device is installed. For most communication systems, raw data collected at a high sampling rate cannot be passed to a host system on a plant-wide basis due to bandwidth limitations of the communication protocols between field devices and the host system. Even if it becomes possible in the future, loading the networks with excessive raw data transfers will adversely affect the other tasks on the networks for measurement and control. Thus, it is proposed in the first instance to provide one or more data processing methodologies described herein within SPM blocks or modules within the field devices or other devices which collect the raw data.

Figure 5:
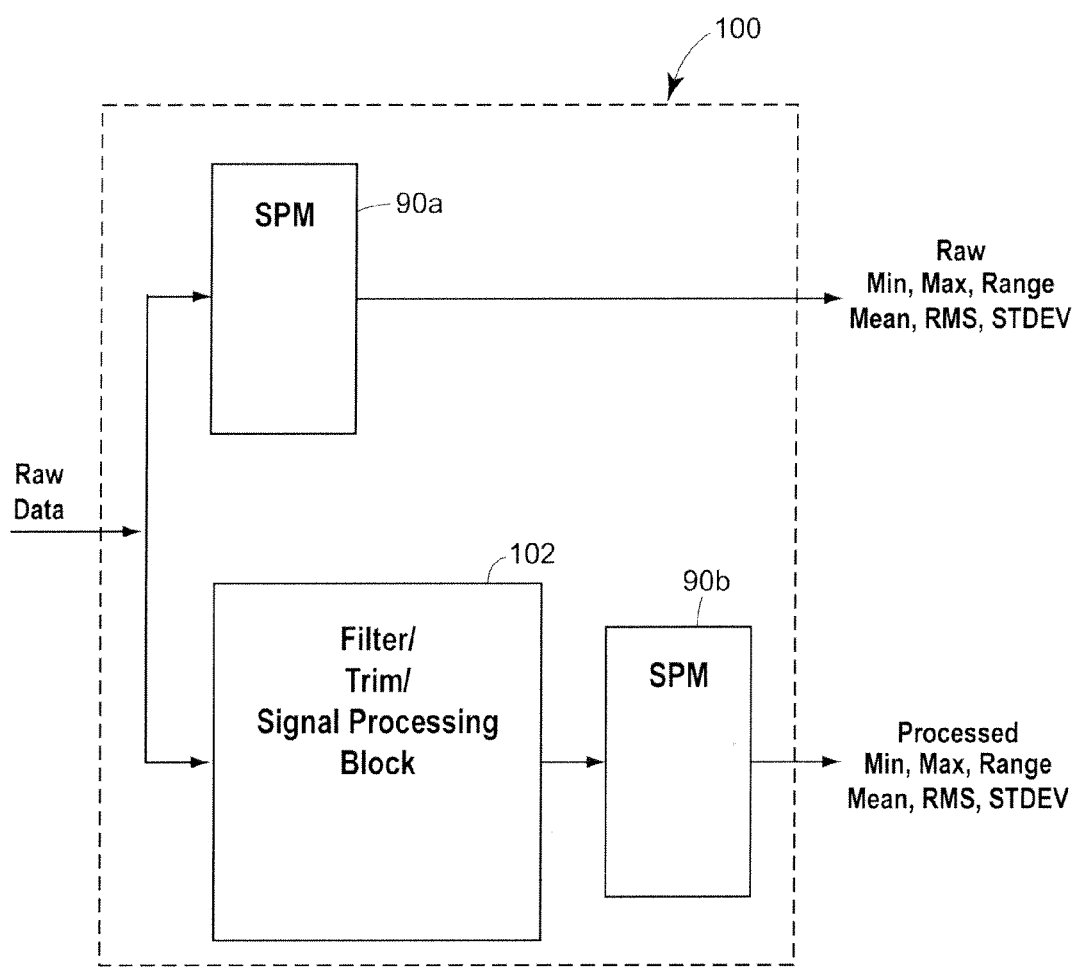
FIG. 5 is a block diagram of an example SPM module that uses multiple SPM blocks and a data processing block to perform signal processing on raw data to produce enhanced SPM statistics.

As noted above, FIG. 3 illustrates a basic SPM block for performing statistical process monitoring calculations on raw data. As an example, the Rosemount 3051 transmitters use a simpler version of the block of FIG. 3, where only the mean and the standard deviation are computed and are passed to a host system. However, it has been determined that calculating these values as well as the RMS value and Range information of a signal does not necessarily yield healthy monitoring and diagnostics information in all cases. In fact, it has been found that in some cases, better statistics may be determined by comparing these parameters not only to their past baselines, but also to similar parameters evaluated on processed forms of the raw data input. In particular, additional information may be obtained by having the SPM block calculate statistical measures of the raw data as well as statistical measures of filtered or processed versions of the raw data and then comparing these calculated statistical measures. As illustrated in FIG. 5 for example, an SPM module 100 may include two SPM blocks 90*a* and 90*b* and a signal processing block 102. Raw data may be processed as usual in the SPM block 90*a* to produce various statistical measures (e.g., Min, Max, Range, Mean, RMS, Standard Deviation, etc.) on the raw data. However, the raw data may also be processed in the signal processing block 102, which may filter the raw data, trim the raw data to remover outliers, etc. The processed raw data may then be provided to the SPM block 90*b* which determines one or more statistical measures on the processed data. The raw data statistical measures and the processed data statistical measures may then be compared to one another to detect or determine information about the raw data. Moreover, one or both of the raw data statistical measures and the processed data statistical measures may be used in subsequent processing to perform, for example, abnormal situation detection.

Thus, as will be understood, the signal processing block 102 of FIG. 5 may implement various data processing techniques that are extremely useful in performing monitoring and diagnostics within a process plant that using statistical process monitoring. The first of these techniques is the capability to trim raw data, which is useful in detecting and then eliminating spikes, outliers and bad data points so that these data points do not slew statistical parameters. Trimming could be performed based on sorting and removing certain top and bottom percentages of the data, as well as using thresholds based on the standard deviation or some weighted moving average. Trimmed points may be removed from the data sequence, or an interpolation may be performed to replace outlier data with an estimate of what that data should be based on other data collected prior to and/or after that data.

Figure 6:
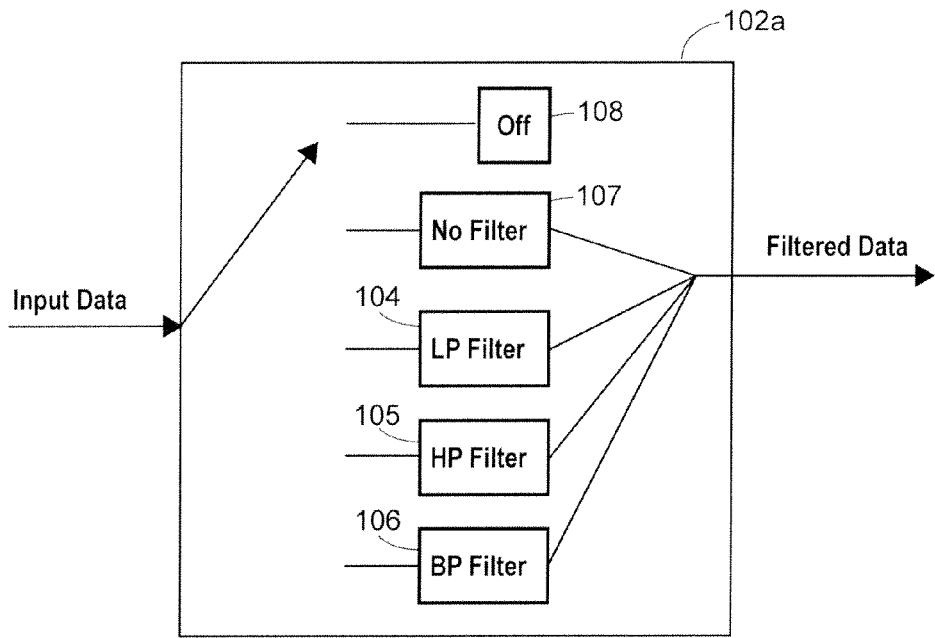
FIG. 6 is a block diagram of a first example data processing block of FIG. 5 that implements one of multiple different types of filters.

Moreover, the signal processing block 102 may perform one or more different types of filtering to process the raw data. FIG. 6 illustrates a signal processing block 102*a* which includes multiple filters to enable a user or the person configuring the system to select the desired type of filtering. In the block 102*a* of FIG. 6, three digital filters which may be applied individually or in combination to achieve good results in many applications, as well as good performance in determining accurate statistical data, are illustrated as a low pass filter 104, a high pass filter 105, and a bandpass filter 106. Of course other types and numbers of filters could be provided as well or instead of those illustrated in FIG. 6. Additionally, a no filter option or block 107 simply passes data unprocessed through the block 102*a*, while an off block 108 blocks data through the block 102*a*. During configuration of the block 102*a*, a user may select the one or more filters 104-108 which are to be used to filter the data in the processing block 102*a*. Of course, the filters may be implemented using any known or available digital signal processing techniques and may be specified or defined using any known filter parameters, for example, the desired slope of the filter, the pass and rejection frequencies of the filter, etc.

Figure 7:
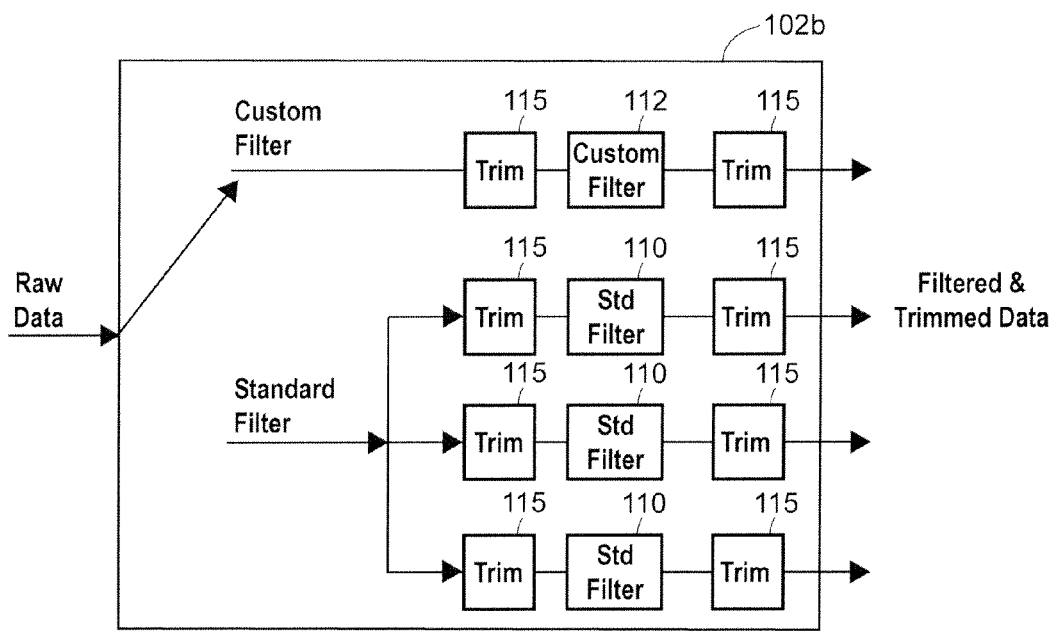
FIG. 7 is a block diagram of a second example data processing block of FIG. 5 that includes data trimming blocks and that implements one or more different types of filters to produce filtered and trimmed data.

FIG. 7 illustrates another signal processing block 102*b* that can be used to filter and/or trim raw data. The signal processing block 102*b* includes multiple standard filters (which may be for example, low pass, high pass and band pass filters) 110 as well as a custom filter 112. These options enable a user to select any of a number of different desired filter characteristics within the processing block 102*b*. Data trimming blocks 115 may be placed before and/or after each of the filters 110 and 112 to perform data trimming in any of the manners discussed above or using any known or available technique. As will be understood, the data processing block 102*b* enables a user or operator to select between one or more standard filters to filter (and trim) the raw data as well as a custom filter to filter (and trim) the raw data to produce filtered (and trimmed) data. This configuration of a filtering and trimming data to be provided to an SPM block provides a strong and versatile technology that can be used in a broad spectrum of monitoring and diagnostics applications.

Of course, many different types of filters may be used in the SPM modules and data processing blocks such as those of FIGS. 5-7. In one embodiment, it is possible to isolate the noise portion of a signal using one or more digital high pass IIR (infinite impulse response) filters or FIR (finite impulse response) filters. A typical FIR filter of order n has the following structure:

$$y_t = \sum_{i=0}^{n} a_i * x_{t-i}$$

where y is the filtered value, x is the current/previous measurement and a is the filter coefficient. As is known, these filters are designed to match certain frequency response criteria to match a desired filter transfer function.

Figure 8:
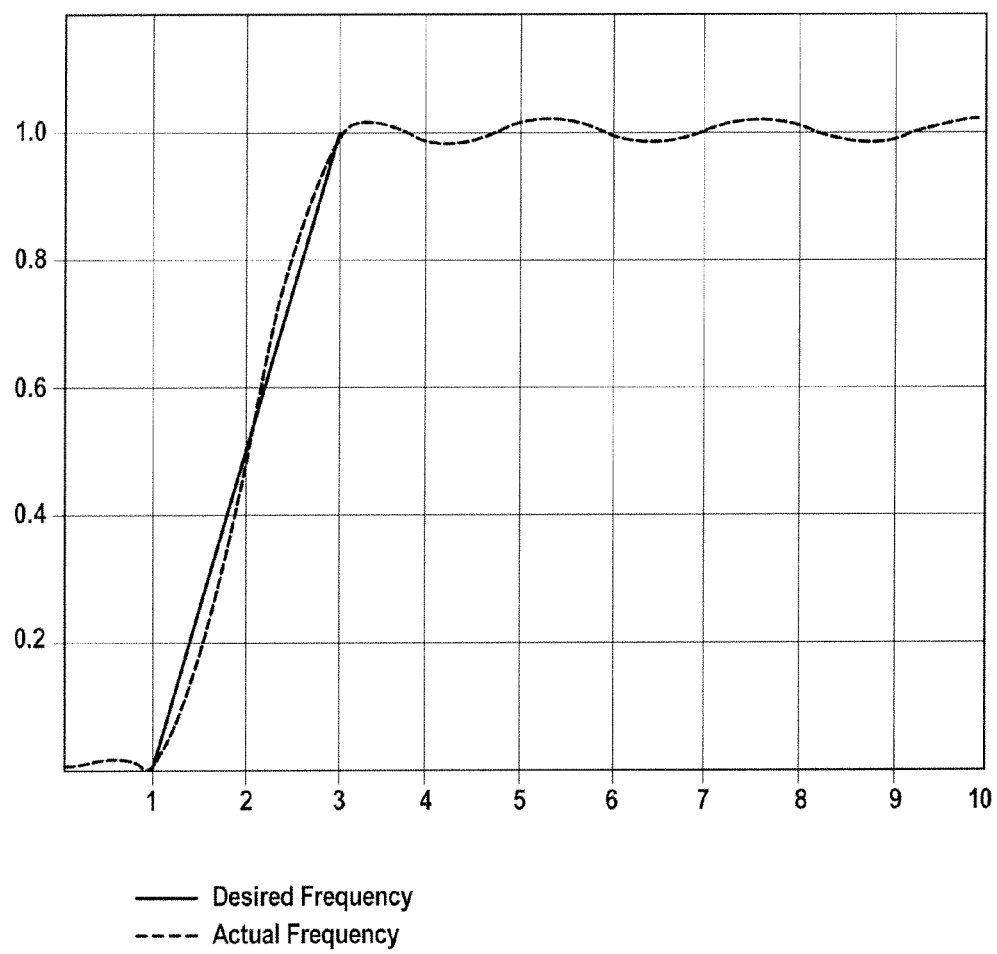
FIG. 8 illustrates the transfer function of a known $16^{th}$ order FIR high pass filter.

FIR filters are known and are currently used in, for example, a known plugged line diagnostics algorithm provided in known Rosemount transmitters and in the Rosemount AMS SNAP-ON products. In these cases, the FIR filter is in the form of a $16^{th}$ order FIR filter with the transfer function illustrated in FIG. 8. In this figure, frequency is normalized so that 1 is equal to the half the sampling rate which is 1 Hz. Therefore, as illustrated in FIG. 8, the displayed filter will block all parts of the signal from DC to about 1.1 Hz and will pass the parts from about 3.3 Hz to 11 Hz. The transition band is from about 1.1 Hz to about 3.3 Hz. The primary purpose of this filter is to remove transients from the signal so that it is possible to compute the standard deviation of the noise. However, this filter can not guarantee that all transients will be removed because some transients will have faster components (i.e., falling with the pass band of the filter). Unfortunately, it is not possible to design a transition band much higher than that shown in FIG. 8 using FIR techniques because such a transition band would filter process noise along with transients. Thus, in summary, such an FIR filter will either pass some transients or filter out some noise. In addition, because the DC gain will not be zero, the mean of the filtered signal will not reach zero, but will instead carry an offset, which is not desirable. Furthermore, because this filter is a $16^{th}$ order filter, it requires many computations at every point, which increases the required processing power and/or decreases the ability to perform the filtering in real time, especially when using a high sampling rate.

Another filter, which may be for example implemented as the custom filter 112 of FIG. 7 and that can be advantageously used in an SPM block or module for any purpose, for example to perform plugged line diagnostics and flame instability detection, is a simple difference filter. This difference filter can be pre-applied to a data measurement sequence (e.g., prior to SPM block processing) to evaluate and eliminate or reduce the short term variation in the measurement sequence or signal. In particular, this proposed difference filter, which again may be used to remove trends/transients and to isolate the noise portion of a signal, may be implemented, in one embodiment, as a first order difference filter defined as:

$$y_t = x_t - x_{t-1}$$

wherein:

$y_t$ is the filtered output at time t, and $x_t$ is the raw data at time t.

Figure 9:
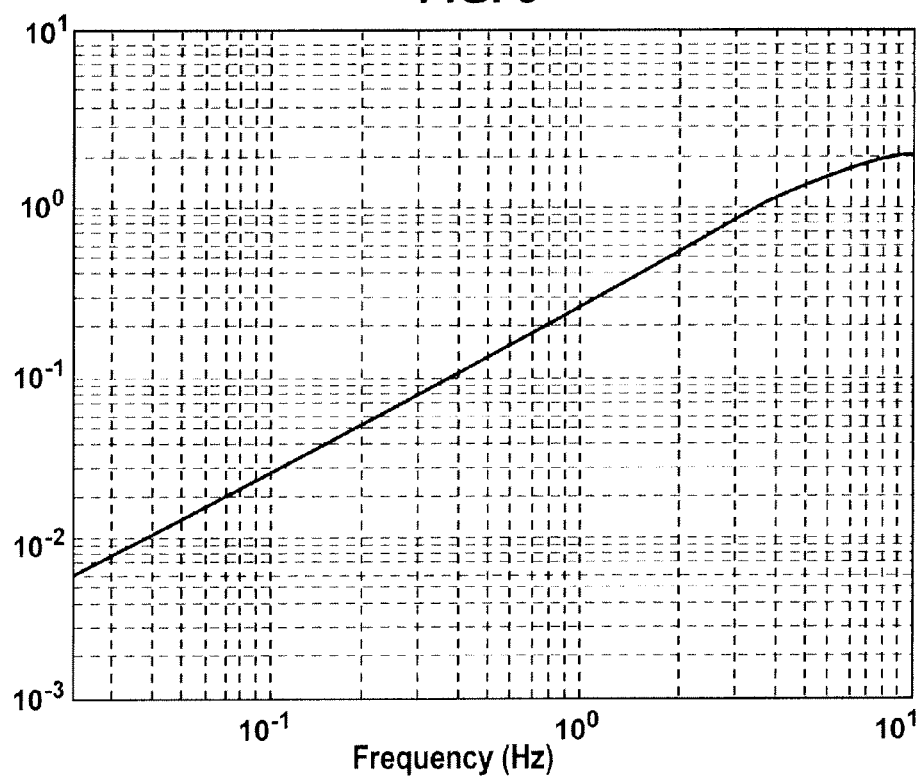
FIG. 9 illustrates a transfer function of a difference filter that may be used to filter received process data in an SPM module.
Figure 10:
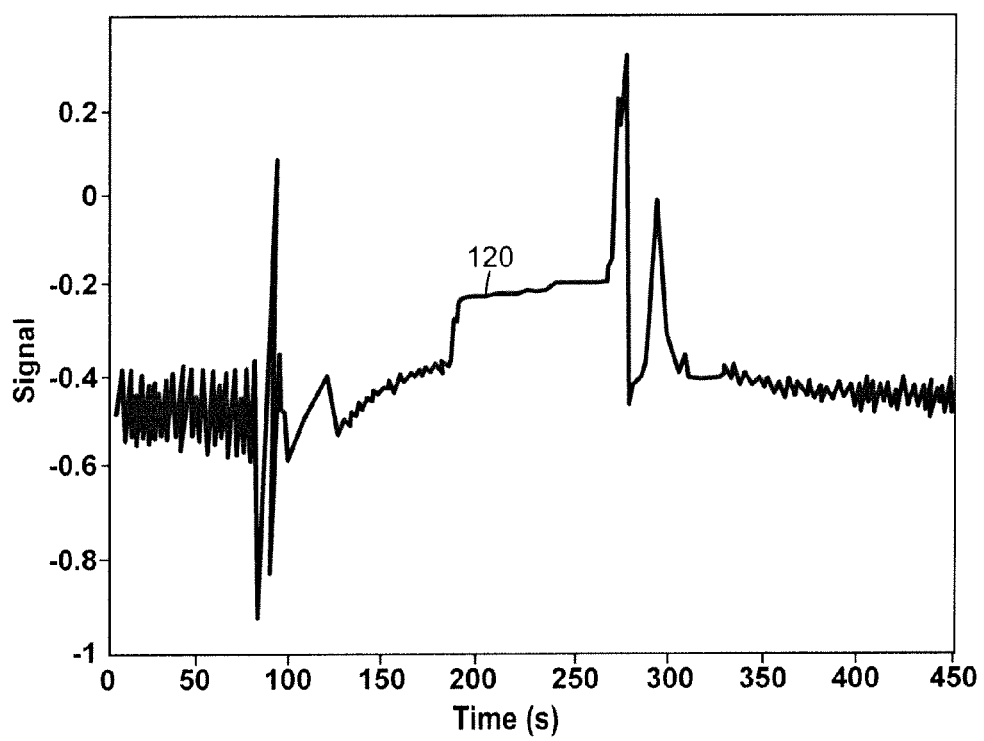
FIG. 10 illustrates a set of raw pressure data including process noise and transients to which the filter of FIG. 9 is to be applied.
Figure 11:
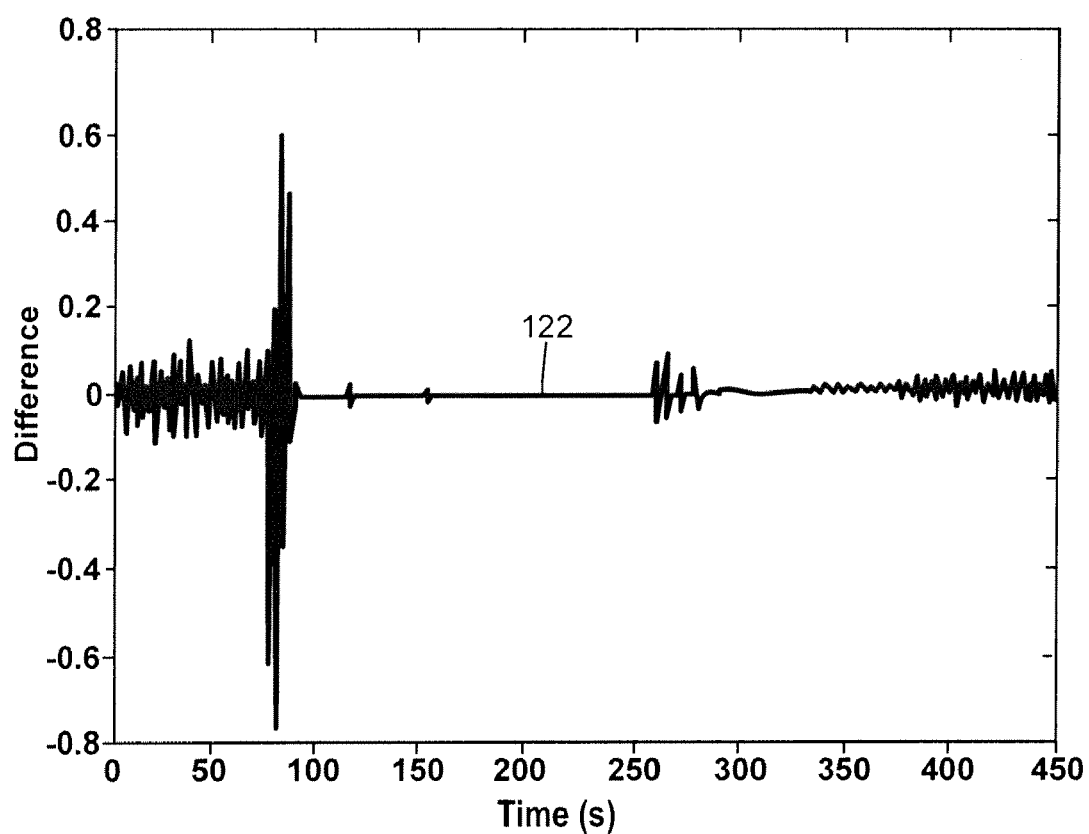
FIG. 11 illustrates a set of filtered data after application of the filter of FIG. 9 on the pressure data of FIG. 10.

Of course, higher order difference filters may be used as well or instead. The frequency response or transfer function of this filter is illustrated in FIG. 9 and, as will be understood, this filter continuously promotes higher frequencies and continuously demotes lower frequencies. Because the frequency content of the trends and transients in a signal are unknown, this filter is believed to have an optimal structure for all possible trends in a signal. As an example of the application of this filter, FIG. 10 illustrates a pressure signal 120, composed of signal trend and some pressure noise, while FIG. 11 illustrates the filtered signal 122 after application of the proposed first order difference filter described above (i.e., with the transfer function shown in FIG. 9). It can be clearly seen from these results that a difference filter can handle a variety of pressure conditions with minimal computations.

The primary advantage of the difference filter described above is that it removes intermediate and long term variations in a given signal, and that it isolates the short term variation in the signal, which is sometimes called the "process noise." Another advantage of this difference filter is that it is a first order filter and requires only one subtraction per measurement point, as compared to 17 multiplications and 16 additions needed by the $16^{th}$ order FIR filter described above. This difference filter is therefore extremely computationally efficient and is thus well-suited for on-board applications, i.e., those provided within field devices and SPM blocks or modules located in the devices within the process plant.

Another important aspect of making accurate and useful statistical determinations in SPM blocks (and elsewhere) involves selecting an appropriate data block or time length over which to calculate the statistical measures, such as the mean, the standard deviation, etc. In fact, an inherent problem in calculating the mean, standard deviation, etc. for a given data sequence, is that these statistical parameters depend heavily on the length of the time period and thus the number of data points used to perform the calculations. Using pure statistical guidelines for the number of points as an appropriate sample set often does not work well because most processes do not fit the underlying statistical assumptions exactly, and thus the number of steady state points suggested by these guidelines may not be available at any particular time.

One method of calculating an appropriate block length to use, however, includes collecting, during a test period, a number of test points for a signal, wherein the number of test points is much greater than the possible block length, determining the frequency components (e.g., frequency domain) of the signal based on the collected test points, determining the dominant system time constant from the frequency components and then setting the block length as some multiple (which may be an integer or a non-integer multiple) of the dominant system time constant.

Figure 12:
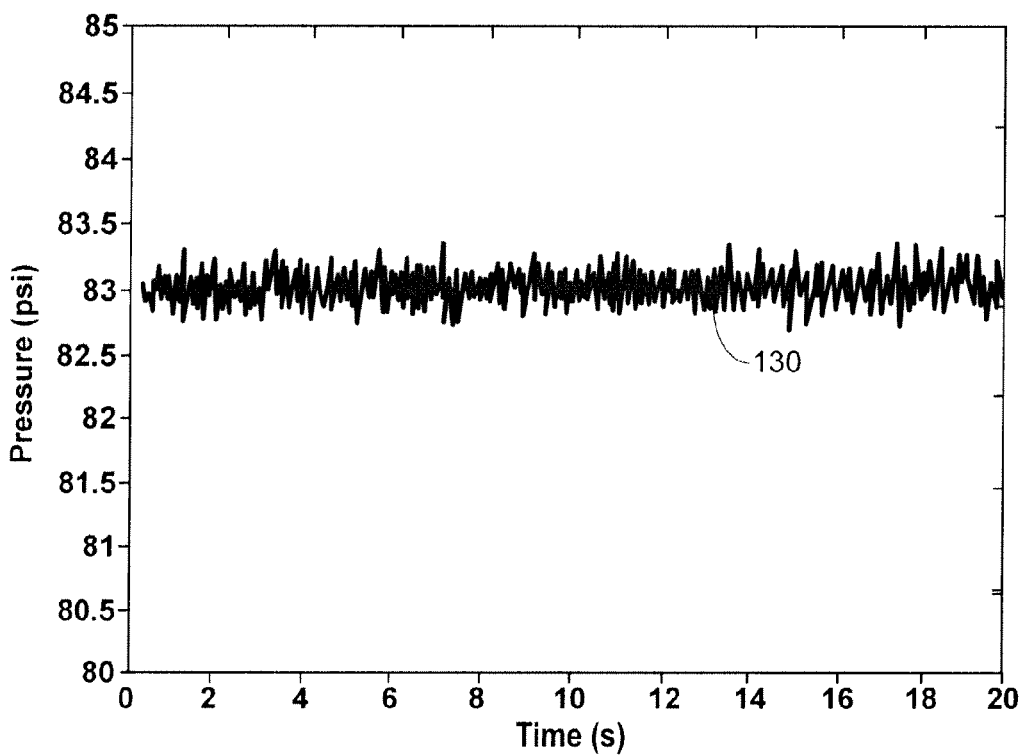
FIG. 12 illustrates a plot of a typical pressure signal in the time domain.
Figure 13:
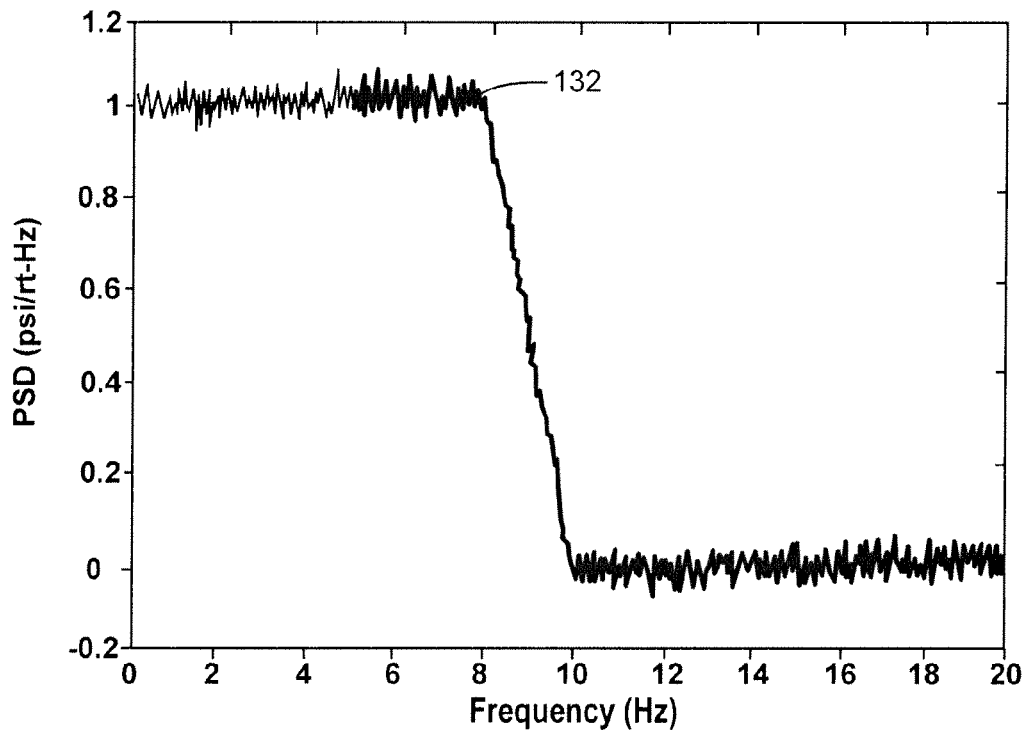
FIG. 13 illustrates a frequency domain representation of the pressure signal of FIG. 12 after the application of a Fast Fourier Transform.

According to this method, the frequency components or domain of a signal X(t) is first determined. For example, assume that the data sequence in the time domain is given by $X(t)=x_1, x_2, x_3, \ldots x_n$, wherein the x data points are measured at times $t_1, t_2, t_3, \ldots t_n$. Here, it is assumed that the corresponding time points t are uniformly spaced. The time domain representation of a typical pressure signal 130 is depicted in FIG. 12. Next, a Fourier Transform, such as a Fast Fourier Transform may be applied to the pressure signal 130 to determine the frequency components of the pressure signal 130. An example transformed signal X(f) illustrating the frequency domain of X(t) for the pressure signal 130 of FIG. 12 is illustrated as the plot 132 in FIG. 13. As is known, the FFT 132 of the signal X(t), illustrates all of the cyclic behavior in the data as a function of cyclic frequencies.

Next, a corner frequency $f_c$ of the pressure signal may be determined by (1) finding the frequency where the FFT drops to some factor (such as a factor of 10) from its peak and (2) finding any isolated peaks in the FFT. In particular, it is desirable to eliminate isolated peaks in the FFT prior to determining the frequency drop because these peaks can pull the maximum FFT values artificially high. That is, the corner frequency should be determined based on the drop from the low frequency level of the FFT after ignoring the isolated peaks or spikes in the FFT. Using the isolated peaks in the FFT might lead to errors in the corner frequency (or bandwidth) computations. Thus, in the plot of FIG. 13, the corner frequency $f_c$ may be selected as being approximately 10 Hz. The corner frequency $f_c$ may then be used to develop or estimate the dominant system time constant $T_C$. In one embodiment $T_C=1/f_c$.

A robust block size may then be chosen as some multiple of the dominant system time constant $T_c$. For example, ten times the dominant system time constant $T_c$ may be used to produce a robust block size for any application. However, other integer or non-integer multiples of the dominant system time constant $T_c$ may be used instead.

In some situations, it is desirable to fit or match a sine wave to a specific data set to determine a best fit for a sine wave to the data set, with the sine wave providing information about specifics of the data set, such as dominant periodic frequency, etc. One method that may be used to fit a sine wave to a given data set is through the use of a linear least squares technique. However, because the form of a sine wave is nonlinear, routine linear regression methods cannot be applied to find the sine wave parameters, and thus nonlinear curve fitting techniques have to be applied to evaluate the parameters. However, nonlinear curve fitting techniques typically require an excessive number of iterative computations, which requires significant processing time and power. Moreover, nonlinear techniques have to assure computational stability and convergence to a solution, which are highly complex concepts and hard to implement in SPM blocks or modules.

To overcome these problems, two practical manners of fitting a sine wave to a data set using a simple linear regression technique, but that can be used in SPM blocks or other blocks within field devices without requiring a lot of processing power are described below.

As is known, a generic sine wave may be expressed in the form of:

$$y(t)=a+b\sin(\omega t+\phi)$$

and for this discussion, this will be the form of a sine wave to be fitted. However, other sine wave forms may be used instead.

According to a first method of fitting this sine wave, referred to herein as a one pass fit method, the sine wave parameters a (the offset) and b (the gain) are first estimated using simple techniques. For example, the offset a may be estimated as the mean value of the entire data set while the gain b may be estimated as half of the difference between a minimum and a maximum value of the entire data set. Of course, the offset a may be estimated using, for example, the median or other statistical measure and the gain b may be estimated using some other technique, such as using the root mean squared (RMS) value, etc.

Next, a variable transformation may be applied or selected as:

$$z = \frac{\sin^{-1}(y) - a}{b}$$

where y is the measured data point. With this transformation, the regression expression (the original sine wave form becomes:

$$z(t)=\omega t+\phi$$

This equation is obviously in a linear form and, as a result, simple linear regression expressions can be used to fit ω and φ as a function of time, resulting in an estimate for each of the parameters of the sine wave (i.e., a, b, ω and φ). In particular, the variable transformation defining z is used to compute the transformed data points z(t) for each time t. Then linear regression techniques can be used to select the ω and φ that best fit the set of data points z(t).

A second method, referred to herein as an iterative fit method, uses an iterative technique to determine the sine wave parameters of a, b, ω and φ. In this method, the initial values for a, b, ω and φ may be estimated using the technique of the one pass fit method described above. Next, the following variable transformation may be applied.

$$x=\sin(\omega t+\phi)$$

With this transformation, the original sine wave expression (to be fit) becomes:

$$y(x)=a+bx.$$

This equation is in a linear form and therefore simple linear regression expressions can be used to fit a and b. These parameters may then be used along with the variable transformation defining x to fit for the parameters ω and φ. These iterations may be executed until one or all four of the parameters (a, b, ω and φ) converge, that is where:

$$|a_k-a_{k-1}|<\epsilon_a$$

$$|b_k-b_{k-1}|<\epsilon_b$$

$$|\omega_k-\omega_{k-1}|<\epsilon_\omega$$

$$|\phi_k-\phi_{k-1}|<\epsilon_\phi$$

Where k is the iteration step and ε is the desired tolerance. The above convergence criteria are absolute with respect to the parameters. However, if desired, a relative measure in percent may also be employed for the parameters.

The first method outlined above provides an extremely fast one pass fit for a function of sinusoidal shape using a linear least squares fit. The second method combined with the first method, on the other hand, while requiring more calculations, typically provides a fit of the parameters to a desired accuracy with only a couple of iterations. However, both methods are extremely computationally efficient as compared to their non-linear counterparts, which results in significant savings in processing, memory and storage requirements, making these methods more suitable for a variety of fitting applications within SPM blocks.

One advantageous manner of using an SPM block relates to the monitoring of a distillation column tray and performing diagnostics using statistical process monitoring for the distillation column tray. In particular, various diagnostics methodologies based on actual pressure and differential pressure readings can be used to determine the health of distillation columns (also called fractionators). The distillation column is probably one of the most important units in most refineries and chemical plants, because the distillation column is responsible for most of the physical separation processes in these plants. The methodologies described here could be implemented either in the field devices within the plant (in for example, a Rosemount 3426 transmitter), or at the host system as software. The main advantage of these methods is the use of statistical process parameters that are evaluated by field instruments but that provide high quality measurements and faster estimates.

Figure 14:
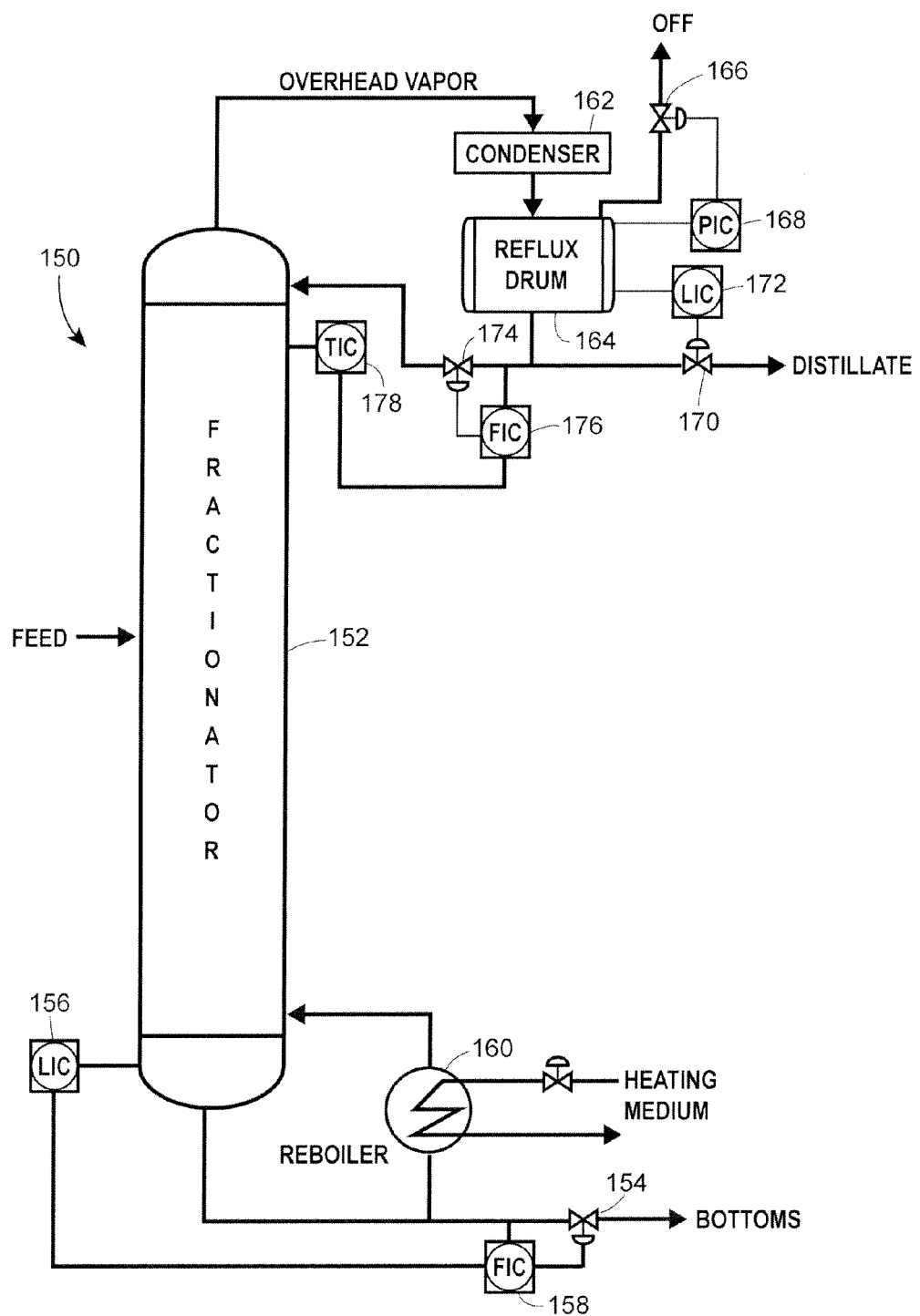
FIG. 14 is a block diagram of a typical distillation column used in refineries and chemical plants.

FIG. 14 illustrates a schematic of a typical distillation column 150 found in many refineries or chemical plants. As can be see from FIG. 14, the distillation column 150 includes a fractionator 152 into which the feed is applied. At the bottom of the fractionator 152, the heavy fluid or "bottoms" material is removed through a valve 154, which may be controlled based on a level sensor 156 and a flow sensor or transmitter 158. Some of the bottoms material is reheated in a reboiler 160 and provided back into the fractionator 152 for further processing. At the top of the fractionator 152, vapor is collected and is provided to a condenser 162 which condenses the vapor and supplies the condensed liquid to a reflux drum 164. Gas in the reflux drum 164 may be removed through a valve 166 based on a pressure sensor 168. Likewise, some of the condensed liquid in the reflux drum 164 is proved out as distillate through a valve 170 based on the measurements of a level sensor. In a similar manner, some of the condensed liquid in the reflux drum 164 is provided back into the fractionator 152 through a valve 174 which may be controlled using flow and temperature measurements from flow a sensor 176 and a temperature sensor 178.

Figure 15:
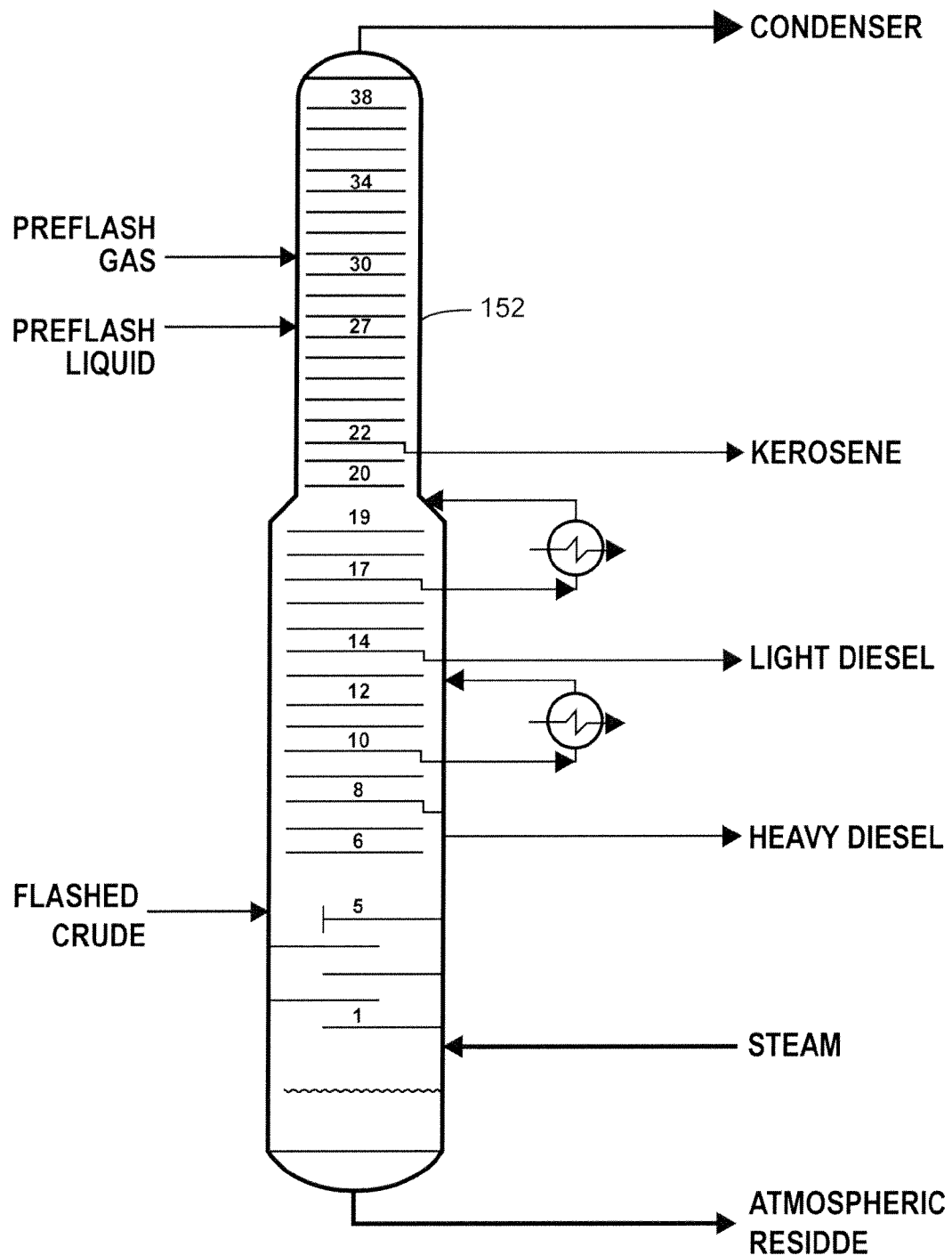
FIG. 15 is a block diagram illustrating various trays of the fractionator of the distillation column of FIG. 14.

FIG. 15. illustrates a schematic of a typical fractionator 152 used in petroleum processing showing the locations of various trays that are sometimes used to extract liquids at various physical condensation points. As illustrated in FIG. 15, flashed crude is injected at tray 5 while heavy diesel is removed at tray 6, light diesel is removed at tray 13 and kerosene is removed at tray 21. Preflashed gas and preflashed liquids may be injected at trays 27 and 30. While the following discussion of the diagnostic methods used in the distillation column refers to the trays of FIG. 15 as a baseline distillation column configuration, these methods may be used in other distillation columns having other tray arraignments and structures.

The first processing method determines if there is a low pressure drop across two trays of the column. In particular, if the pressure drop across a tray is less than a low nominal pressure, it typically means that the tray is either damaged or is dumping. This nominal low pressure ($P_{ln}$) is, in one instance, 0.06 psi (pounds per square inch) for a 24 inch diameter ($D_n$) distillation tray. For other sizes of tray diameters (D) the nominal low pressure $P_l$ may be calculated as:

$$P_l = P_{ln}\sqrt{\frac{D}{D_n}}$$

Statistical process monitoring can be used to determine a baseline for the pressure drop across a tray using any of the SPM blocks and techniques described above, and then a monitoring phase may be used in an SPM or other block to detect the reduction in the mean pressure drop. If the differential pressure is measured across multiple trays, the expected pressure drop is simply the pressure drop for a single tray times the number of trays. Thus, after determining a baseline pressure drop across a tray for the fractionator 152 of FIG. 15 using pressure sensors (not shown in FIG. 15) at the appropriate locations within the fractionator 152 or using a threshold established using the low nominal pressure calculations discussed above, SPM blocks may monitor the pressures to determine a mean pressure at each location and to determine the difference between these mean pressures. If the difference becomes lower then the low nominal pressure (set as a threshold), then an alarm or alert may be sent indicating that the tray is damages or is dumping, or is at a condition that it will start this process.

Additionally, a high pressure drop across trays of a distillation column may be determined using this same technique. In particular, if the pressure drop across ahoy is more than a high nominal pressure, it typically indicates that either there is fouling or there is plugging (e.g., at least partial plugging) of the tray. The nominal high pressure ($P_{hn}$) may be 0.12 psi for a 24 inch diameter ($D_n$) distillation tray. For other sizes of trays, the $P_h$ may be calculated as:

$$P_h = P_{hn}\sqrt{\frac{D}{D_n}}$$

Similar to the low pressure drop method described above, statistical process monitoring can be used to determine a baseline mean pressure drop across a tray or a group of trays or a threshold may be established using the calculations described above, and then the monitoring phase is used to detect the reduction in the mean pressure drop. If the differential pressure is measured across multiple trays, the expected pressure drop is simply the pressure drop for a single tray times the number of trays. In either case, it will be understood that distillation column pressure drop monitoring using statistical parameters provides a fast and efficient indication of tray problems in chemical and refining industries.

Additionally, diagnostics using statistical process monitoring may be advantageously performed in fluid catalytic crackers (FCCs). In particular, various diagnostic methodologies can be used to determine the health of an FCC, which is highly advantageous because the FCC is probably the most important unit in a refinery, as it is responsible for most of production of gasoline in a refinery, which is typically the most important and most prevalent product produced by the refinery. The statistical processing methodologies described here can be implemented either in field devices, such as in the Rosemount 3420 transmitter, or at the host system as software. The main advantage of these methods is the use of statistical process parameters evaluated by field instruments that provide high quality measurements and faster estimates.

Figure 16:
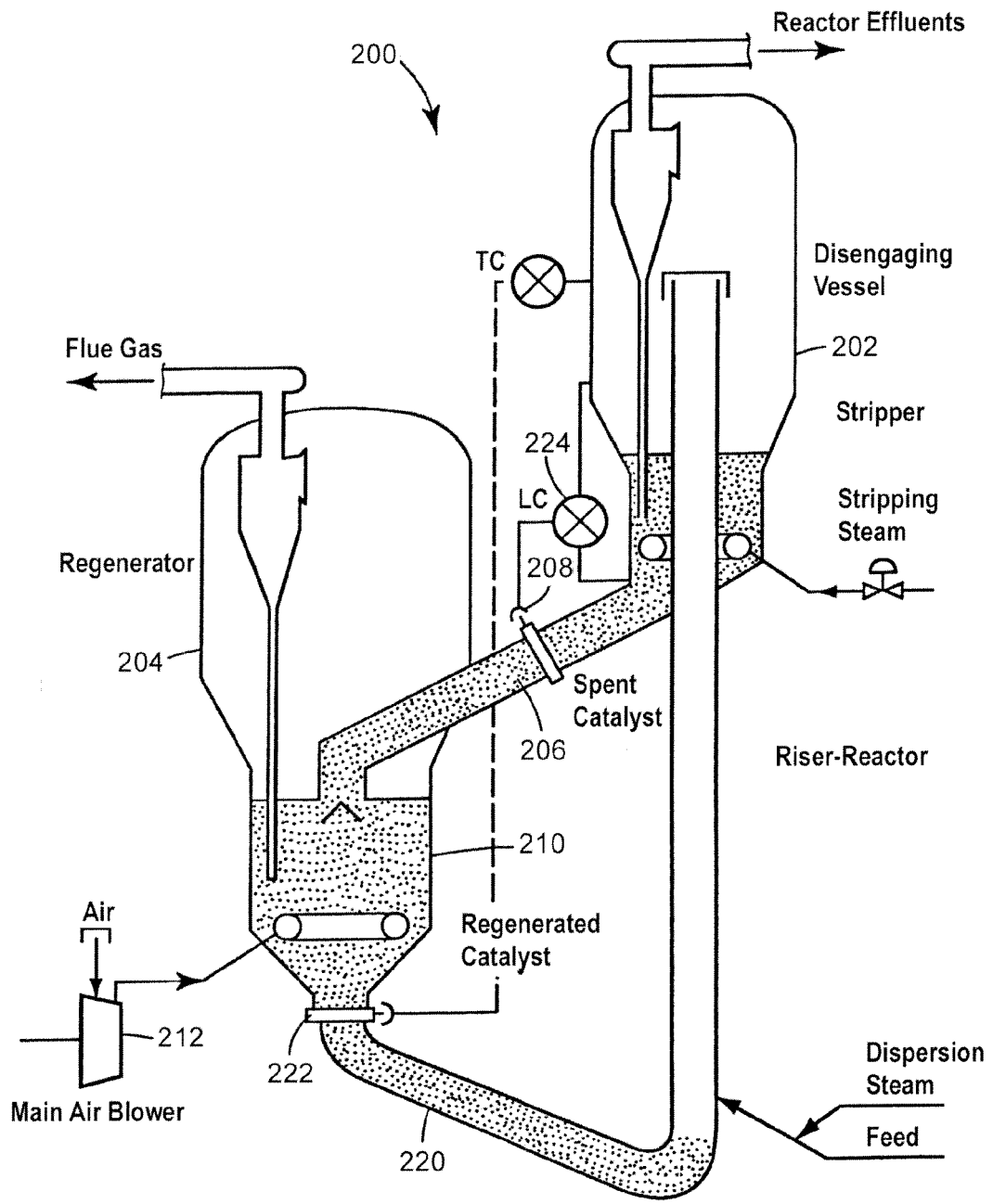
FIG. 16 is a block diagram of a typical fluid catalytic cracker used in a refinery.

FIG. 16 illustrates a schematic of a typical FCC 200 found in refineries and that will be used as the baseline FCC configuration for the diagnostic methods described herein. However, it will be understood that these methodologies may be used in other types of FCCs or in FCCs with other configurations as well. In particular, as illustrated in FIG. 16, the FCC 200 includes a reactor 202 and a catalyst regenerator 204. During operation, feed and dispersion steam are feed into a riser 206 where the feed reacts with regenerated catalyst. This process "cracks" the feed. At the top of the reactor 202, the product and catalyst are separated with the product being expelled as reactor effluent. The catalyst falls to the bottom of the reactor 202 and is steam stripped using stripping steam. The spent catalyst is then provided through a pipe 206 controlled by a valve 208 to the regenerator 204. The spent catalyst is input into a combustion chamber and is mixed with superheated air provided by an air blower 212 which burns the coke that has formed on the catalyst as a result of the catalytic reaction in the reactor 202. This process regenerates the catalyst. The heat from this process and the regenerated catalyst are then provided back to the bottom of the reactor 202 via a regenerated catalyst pipe 220 controlled by a regenerated catalyst valve 222 to mix with the incoming feed.

A first statistical method may be used in the FCC 200 to detect a failed or faulty air compressor or blower. In particular, a failed air compressor results in a reversal of flow in the regenerated catalyst pipe 220 resulting in flow from the reactor 202 to the regenerator 204. This condition may be detected by monitoring pressure in the regenerator 204 or monitoring differential pressure across the regenerated catalyst valve 222. In particular, during normal operation of the FCC 200, the pressure in the regenerator 204 is higher than that in the reactor or riser pipe 202, which produces the flow of regenerated catalyst in the correct direction. Loss of the compressor 212 on the regenerator 204 causes a loss of pressure at the regenerator 204 and results in a reversal of this differential pressure.

Additionally, a statistical method may be used to detect reactor to regenerator pipe plugging. In particular, when the pipe 206 between the reactor 202 and the regenerator 204 plugs, the reactor 202 fills with catalyst and the catalyst enters into the exhaust or reactor effluent. This condition may be detected by monitoring the mean catalyst level in the reactor 202 using, for example, a level sensor/transmitter 224 as plugging in the pipe 202 causes the catalyst level in the reactor 202 to rise. With proper catalyst level baselining, detecting the mean level of the catalyst within the reactor 202 and comparing it to a baseline mean level for the catalyst could be used to detect plugging in the pipe 206. A second indication that may be used to determine plugging of the pipe 202 may be based on the cross correlation between the pressures and levels in the reactor 202 and the regenerator 204, as the plugging of the pipe 206 would change this correlation. That is, a baseline cross correlation of the mean pressures and levels in the reactor 202 and the regenerator 206 may be determined and then across correlation between these pressures and levels (or the means or other statistical measures of these pressures and levels) may be periodically determined and compared to the baseline, with a significant change in the cross-correlation indicating a potential plugging of the pipe 206.

Moreover, a statistical method may be used to detect a catalyst flow problem or a flow instability in the reactor 202. In particular, a catalyst flow instability will result in a bad product quality and in the catalyst entering into the exhaust of the reactor 202. This condition may be detected using the standard deviation of the differential pressure across the regenerated catalyst valve 222, it being understood that a flow instability would cause an increase in the standard deviation of the differential pressure across the catalyst valve 222.

A statistical method may also be used to detect if there is insufficient steam flow into the reactor 202, which typically results in thermal cracking and coke formation. In particular, detecting insufficient steam flow and correcting the problem reduces catalytic cracking and gives rise to thermal cracking. The existence of insufficient steam flow can be detected by monitoring the mean temperature in the reactor 202. In particular, an increase in mean the reactor temperature indicates a insufficient steam flow problem.

A statistical method may also be used to detect an extreme thermal distribution in the reactor 202, which leads to the formation of coke and therefore fouling of the reactor 202. Extreme thermal distribution may be detected by measuring the reactor temperature at multiple points in the reactor. Uneven temperatures would cause certain regions in reactor 202 to become very hot, which results in the formation of coke in the reactor. Monitoring these temperatures and detecting regions that have very high or low temperatures (or very high or low mean temperatures) as compared to a baseline mean or a threshold yields diagnostics related to extreme thermal distributions.

A statistical method may also be used to detect thermal cracking in the exhaust pipe after the reactor 202, which again leads to the formation of coke in this section of the FCC 200. This condition may be detected by monitoring the mean temperature difference between the exhaust pipe and the reactor vessel. If the mean temperature difference becomes more than some threshold level, such as three degrees Fahrenheit, there may be thermal cracking occurring in the exhaust pipe.

There are three possible platforms to implement these statistical methods and detection. In particular, these conditions may be detected as part of a transmitter advanced diagnostics block disposed within a valve or a transmitter within the FCC 200, such as in the valve 222, the valve 208, a temperature sensor/transmitter, a level sensor/transmitter, a pressure sensor/transmitter, etc. In particular, this diagnostic block may be trained to detect or determine a baseline pressure, temperature, level, differential pressure, etc. when the system is healthy, and then may monitor the mean value of the appropriate pressures, temperatures, levels, differential pressures, etc. after establishing the baseline. On the other hand, this monitoring and detection could be achieved using an SPM block in a transmitter or other field device with a simple threshold logic. That is, the SPM block could monitor one or more process variables to determine the mean, the standard deviation, etc. for these variables and compare these statistical measures to a pre-established threshold (which may be set by a user or which may be based on a baseline statistical measure computed from measurements of the appropriate process variables during a training period). Also, if desired, host level software run in a user interface device or other computing device connected to the field devices, such as an advanced diagnostic block explorer or expert, maybe used to set and monitor normal and abnormal pressures, temperatures, levels and differential pressures and to perform abnormal situation detection based on the concepts described above.

Some or all of the blocks, such as the SPM or ADB blocks illustrated and described herein may be implemented in whole or in part using software, firmware, or hardware. Similarly, the example methods described herein may be implemented in whole or in part using software, firmware, or hardware. If implemented, at least in part, using a software program, the program may be configured for execution by a processor and may be embodied in software instructions stored on a tangible medium such as CD-ROM, a floppy disk, a hard drive, a digital versatile disk (DVD), or a memory associated with the processor. However, persons of ordinary skill in the art will readily appreciate that the entire program or parts thereof could alternatively be executed by a device other than a processor, and/or embodied in firmware and/or dedicated hardware in a well known manner.

While the invention is susceptible to various modifications and alternative constructions, certain illustrative embodiments thereof have been shown in the drawings and are described in detail herein. It should be understood, however, that there is no intention to limit the disclosure to the specific forms disclosed, but on the contrary, the intention is to cover all modifications, alternative constructions and equivalents falling within the spirit and scope of the disclosure as defined by the appended claims.

What is claimed is:

1. A computer-implemented method of fitting a sine wave to data collected within a process plant, comprising:
    determining, using a processor, a first set of parameters of the sine wave based on one or more statistical measures of the process parameter determined from the data collected within the process plant;
    storing, within a memory, a variable transformation of a mathematical expression of the sine wave that produces a linear expression having a second set of sine wave parameters associated therewith;
    using, via a processor, the variable transformation to produce a set of transformed data points from the data collected within the process plant;
    performing, using a processor, a linear regression to fit the transformed data points to the linear expression; and
    determining, using a processor, the second set of sine wave parameters based on the linear regression.

2. The method of claim 1, wherein the first set of parameters of the sine wave includes an offset and a gain.

3. The method of claim 2, wherein determining the first set of parameters of the sine wave includes determining the offset as a mean value of the data collected within the process plant and determining the gain based on the difference between a minimum value and a maximum value of the data collected within the process plant.

4. The method of claim 2, wherein the second set of parameters of the sine wave includes a cyclic frequency and a phase.

5. The method of claim 2, wherein the variable transformation is of the form:

$$z = \frac{\operatorname{Sin}^{-1}(y) - a}{b}$$

wherein:
    z is a transformed data point;
    y is a collected data point;
    a is the offset; and
    b is the gain,
and wherein the linear expression is of the form:

$$z(t) = \omega t + \phi$$

wherein:
    z(t) is the transformed data point at a time t;
    ω is a periodic frequency; and
    φ is a phase.

6. The method of claim 5, further including applying a variable transformation to produce a further linear expression including the offset and the gain, applying a linear regression to the further linear expression to determine a new set of values for the offset and the gain and determining a new set of values for the periodic frequency and the phase based on the new set of values for the offset and the gain.

7. The method of claim 6, including iteratively determining values for the sine wave offset, gain, periodic frequency and phase until a change in the values for one or more of the sine wave offset, gain, periodic frequency and phase becomes less than one or more threshold values.

8. The method of claim 1, wherein determining the first set of parameters of the sine wave, using the variable transformation, performing the linear regression and determining the second set of sine wave parameters are performed in a device that collects or measures the data collected within the process plant.

* * * * *